(12) United States Patent
Fujimura

(10) Patent No.: US 7,536,702 B2
(45) Date of Patent: May 19, 2009

(54) DISK DEVICE FOR MAINTAINING A HORIZONTAL STATE OF A FRONT EDGE PORTION OF AN ELEVATING FRAME

(75) Inventor: Nobuhiko Fujimura, Hachioji (JP)

(73) Assignee: TEAC Corporation, Tama-shi (JP)

( * ) Notice: Subject to any disclaimer, the term of this patent is extended or adjusted under 35 U.S.C. 154(b) by 261 days.

(21) Appl. No.: 11/252,460

(22) Filed: Oct. 18, 2005

(65) Prior Publication Data
US 2006/0085808 A1 Apr. 20, 2006

(30) Foreign Application Priority Data
Oct. 18, 2004 (JP) ............................ 2004-302694

(51) Int. Cl.
*G11B 17/03* (2006.01)
(52) U.S. Cl. ..................................... 720/703
(58) Field of Classification Search ......... 720/620–623, 720/703–709, 713, 689–690, 695–700
See application file for complete search history.

(56) References Cited

U.S. PATENT DOCUMENTS

| RE37,170 E * | 5/2001 | Kurosu ....................... 720/690 |
|---|---|---|
| 6,226,249 B1 * | 5/2001 | Takigawa .................... 720/689 |
| 6,252,839 B1 * | 6/2001 | Huang ........................ 720/690 |
| 6,445,664 B1 * | 9/2002 | Ohkawara et al. ........... 720/633 |
| 6,804,184 B2 | 10/2004 | Ahn |
| 6,912,723 B2 * | 6/2005 | Yumitori et al. ............. 720/692 |
| 7,174,559 B2 * | 2/2007 | Osada ........................ 720/695 |
| 2005/0086673 A1 * | 4/2005 | Ueno et al. ................. 720/622 |
| 2005/0177838 A1 | 8/2005 | Yamada |

FOREIGN PATENT DOCUMENTS

| JP | 2002-117604 | 4/2002 |
|---|---|---|
| JP | 2002-230939 A | 8/2002 |
| JP | 2003-263855 A | 9/2003 |
| JP | 2005-196922 A | 7/2005 |

* cited by examiner

*Primary Examiner*—A. J. Heinz
(74) *Attorney, Agent, or Firm*—Christensen O'Connor Johnson Kindness PLLC

(57) ABSTRACT

A disk device comprising: a turn table, a clamp head, a spindle motor and an elevating frame, wherein the turn table and the clamp head fixed to a driving shaft of the spindle motor disposed at a front end of the elevation frame disposed in a direction along a diagonal line inside of the disk device, and means for rocking a front end of the elevating frame up and down to clamp an optical disk by the clamp head and to hold the optical disk on the turn table or to release the clamping state of the held optical disk,
wherein when the front end of the elevating frame descends, a horizontal state of a plane orthogonal to a diagonal line of the elevating frame is held, or either the left side or right side of the front end of the elevating frame is more inclined than the other.

7 Claims, 35 Drawing Sheets

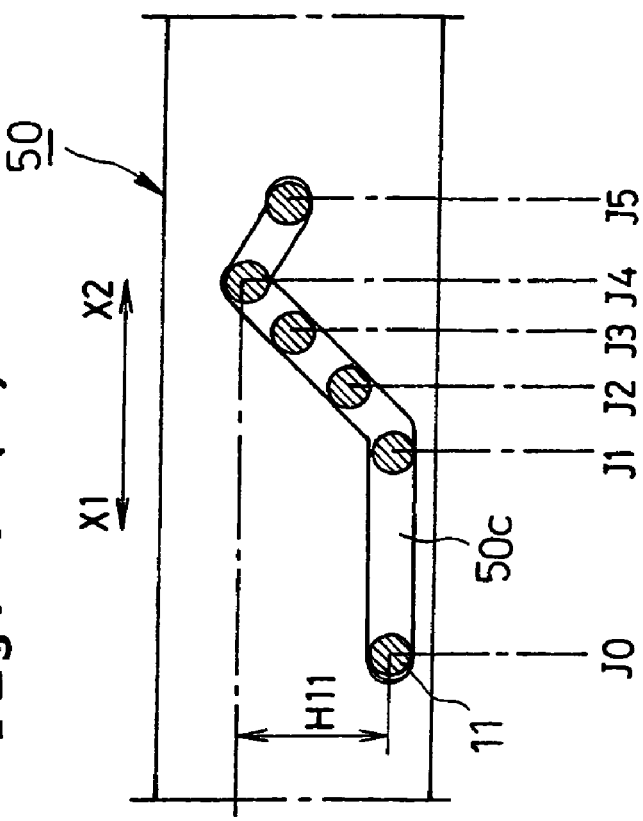
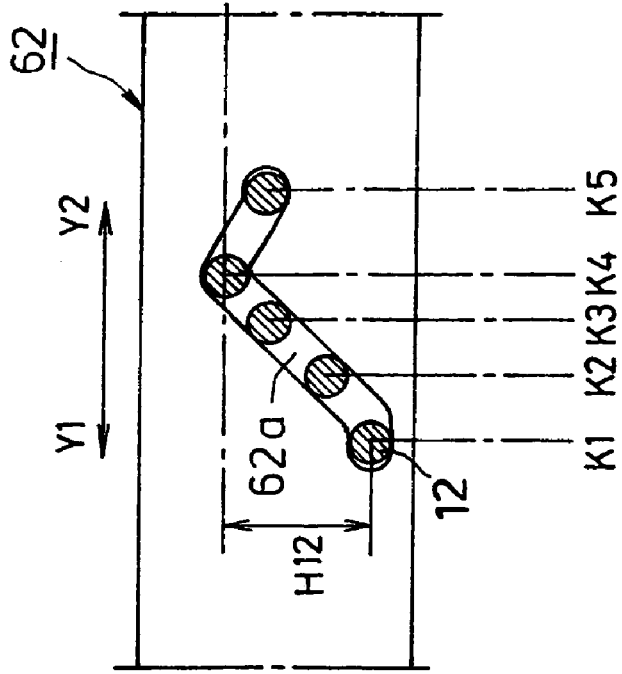

DISK DEVICE FOR MAINTAINING A HORIZONTAL STATE OF A FRONT EDGE PORTION OF AN ELEVATING FRAME

BACKGROUND OF THE INVENTION

1. Field of the Invention

The present invention relates to a disk device that drives an optical disk (for example, a CD-R, a CD-RW, a DVD-R, a DVD-RW, a DVD+R, a DVD+RW, a DVD-RAM or the like) serving as a recording medium for recording a large amount of information in an information apparatus such as various computer systems.

2. Description of the Related Art

Generally, a disk device for driving an optical disk is built in a personal computer or the like. Recently, the personal computers are becoming smaller in size and thickness, consequently the size and thickness of the disk device has also decreased. The three general loading types of the optical disk in a disk device, are as follows: 1) a loading type that loads the optical disk in the disk device; 2) a type that directly loads the optical disk on a clamp head of a disk tray; and 3) a slot-in type that inserts the optical disk from a front bezel.

In the disk device of the slot-in type, the loading of the optical disk on a main body of the disk device is performed in such a manner that an operator inserts a portion of the optical disk in the slot of the front bezel, a loading mechanism provided in the disk device operates, and the optical disk is automatically loaded. Accordingly, since the disk device of the slot-in type does not employ the disk tray, it is considered as the most effective type in achieving the small size and thickness of the disk device.

FIGS. 37 to 39 show a structure of the loading mechanism in the disk device of the slot-in type according to the related art and its operation aspect. In the structure shown in the drawings, if the operator inserts the optical disk D into the slot of the front bezel, the optical disk D reaches the position shown in FIG. 37 while the height direction, and left and right positions thereof are guided by a front end pin 100a of a first rocking body 100, left and right guide bodies 101 and 102, and a front end pin 103a of a second rocking body 103.

At this time, the front end pin 100a is pressed by the optical disk D, so that the first rocking body 100 rotates in the direction of arrow 10A. Further, the front end 103a is pressed by the optical disk D, so that the second rocking body 103 also rotates in direction of arrow 103A. Furthermore, a switch lever 104 is pressed by the end of the second rocking body 103 and rotates in direction of arrow 104A so as to operate a detection switch 105.

When the detection switch 105 is operated, a driving unit 106 is driven, and a first slide member 107 starts to move in the direction of arrow 107A. Each of the first slide member 107 and second slide member 108 has its front end connected to a slide connecting member 109. Since the slide connecting member 109 is pivotally supported by a pin 110 so as to be rocked on the pin 110, the second slide member 108 moves in direction of arrow 108A in synchronization with the backward movement of the first slide member 107.

In this way, if the first slide member 107 starts to move backward, the first rocking body rotates in a direction of arrow 100B. Thereby, the front end pin 100a of the first rocking body 100 carries in the optical disk D in the direction of arrow 107A until the optical disk D comes into contact with pins 111a and 111b of a disk positioning member 111 (see FIG. 38).

At this time, since the pin 103a of the second rocking body 103 rotates in the direction of arrow 103A, the pin 103a of the second rocking body 103 is synchronized with the front end pin 100a of the first rocking body 100 and rotates to a position which is slightly spaced apart from the optical disk D after the optical disk D comes into contact with the pins 111a and 111b of the disk positioning member 111.

The operation aspect of the loading mechanism when the optical disk D is loaded in the disk device has been described. However, in the case when the optical disk D is unloaded from the disk device, the loading mechanism has a reverse operation compared with the above-mentioned operation. That is, when the optical disk D is located at a predetermined position in the disk device, if the driving unit 106 is driven in a reverse rotation direction in response to an unloading instruction, the first slide member 107 starts to move in the direction of arrow 107B, and the second slide member 108 connected to the slide connecting member 109 is synchronized with the first slide member 107 and starts to move in the direction of arrow 108B. Thereby, since the first rocking body 100 rotates in the direction of arrow 100A and the second rocking body 103 rotates in the direction of arrow 103B, the optical disk D is pivotally supported by the respective front end pins 100a and 103a of the first and second rocking bodies 100 and 103 and is then unloaded from the disk device.

In addition, the optical disk D loaded in the disk device is clamped by a clamp head 112 which moves in a vertical direction at a predetermined position. The clamp head 112 is integrated with a turn table 113 fixed to a driving shaft of a spindle motor 114, and the spindle motor 114 is disposed on an elevating frame 115 such that the elevating frame 115 moves in a vertical direction through the elevating mechanism. The elevating mechanism has cam grooves formed at sides of the first and second slide members 107 and 108 having the same clamp shape as shown in FIGS. 39A, 39B, and 39C, and the elevating frame 115 moves in a vertical direction through the horizontal movement of the first and second slide members 107 and 108.

FIGS. 39A, 39B, and 39C illustrate a portion of the first slide member 107. In this case, driven pins 116a and 116b fixed to the elevating frame 115 are locked in the cam grooves 107a and 107b. Accordingly, as shown in FIG. 39A, when the driven pins 116a and 116b are located at the lower portions of the cam grooves 107a and 107b, the elevating frame 115 enters at its most descending state. In addition, as the first slide member 107 moves horizontally in the direction of arrow 107A, the driven pins 116a and 116b ascend along the inclined portions of the cam grooves 107a and 107b. As a result, the elevating frame 115 ascends, such that the clamp head 112 clamps the optical disk D at the highest locations of the cam grooves 107a and 107b as shown in FIG. 39B and the optical disk D is fixed on the turn table 113. If the first slide member 107 further moves in the direction of arrow 107A in the above-mentioned state, the driven pins 116a and 116b slightly descend from the highest portions of the cam grooves 107a and 107b and are then stopped, as shown in FIG. 39C. The optical disk D can be driven.

As such, in the case in which the disk device has the above-mentioned structure, it is required that a stroke width of the vertical movement is ensured such that the clamp head descends to the position where the optical disk can be loaded and then ascends to the position where the clamp head can clamp the optical disk. For this reason, in the elevating mechanism of the disk device according to the related art, the elevating frame moves in a horizontal direction as described above. However, since the stroke width of the vertical movement of the elevating frame is always constant, if a thickness of the elevating frame increases, the total thickness of the disk device increases. In addition, the mechanism for moving the elevating frame in a horizontal direction becomes complicated, making it difficult to achieve the small size and thickness of the disk device.

SUMMARY OF THE INVENTION

The present invention has been finalized in view of the drawbacks inherent in the disk device, and an advantage of the invention is that it provides a disk device which can construct a mechanism for moving an elevating frame in a vertical direction with a simple structure so as to achieve a small size, and can perform mechanical control such that the stroke width of the vertical movement of the elevating frame does not unnecessarily increase and achieve a small thickness.

According to a first aspect of the invention, there is provided a disk device comprising: a turn table, a clamp head, a spindle motor and an elevating frame, wherein the turn table and the clamp head fixed to a driving shaft of the spindle motor disposed at a front end of the elevation frame disposed in a direction along a diagonal line inside of the disk device, and means for rocking a front end of the elevating frame up and down to clamp an optical disk by the clamp head and to hold the optical disk on the turn table or to release the clamping state of the held optical disk, When the front end of the elevating frame descends, a horizontal state of a plane orthogonal to a diagonal line of the elevating frame is held.

According to a second aspect of the invention, there is provided a disk device comprising: a turn table, a clamp head, a spindle motor and an elevating frame, wherein the turn table and the clamp head fixed to a driving shaft of the spindle motor disposed at a front end of the elevation frame disposed in a direction along a diagonal line inside of the disk device, and means for rocking a front end of the elevating frame up and down to clamp an optical disk by the clamp head and to hold the optical disk on the turn table or to release the clamping state of the held optical disk. When the front end of the elevating frame descends, either the left side or right side of the front end of the elevating frame is more inclined than the other.

Preferably, a rear end of the elevating frame is supported in a buffering manner.

BRIEF DESCRIPTION OF THE DRAWINGS

FIGS. 32A and 32B are a diagram illustrating a positional relationship between a cam groove and a driven pin of the invention;

DETAILED DESCRIPTION OF THE PREFERRED EMBODIMENTS

Preferred embodiments of the present invention will now be described in detail with reference to the accompanying drawings. In addition, in order to facilitate recognition of the invention, the invention will be described while referencing an outline of a known structure.

Figure 1:
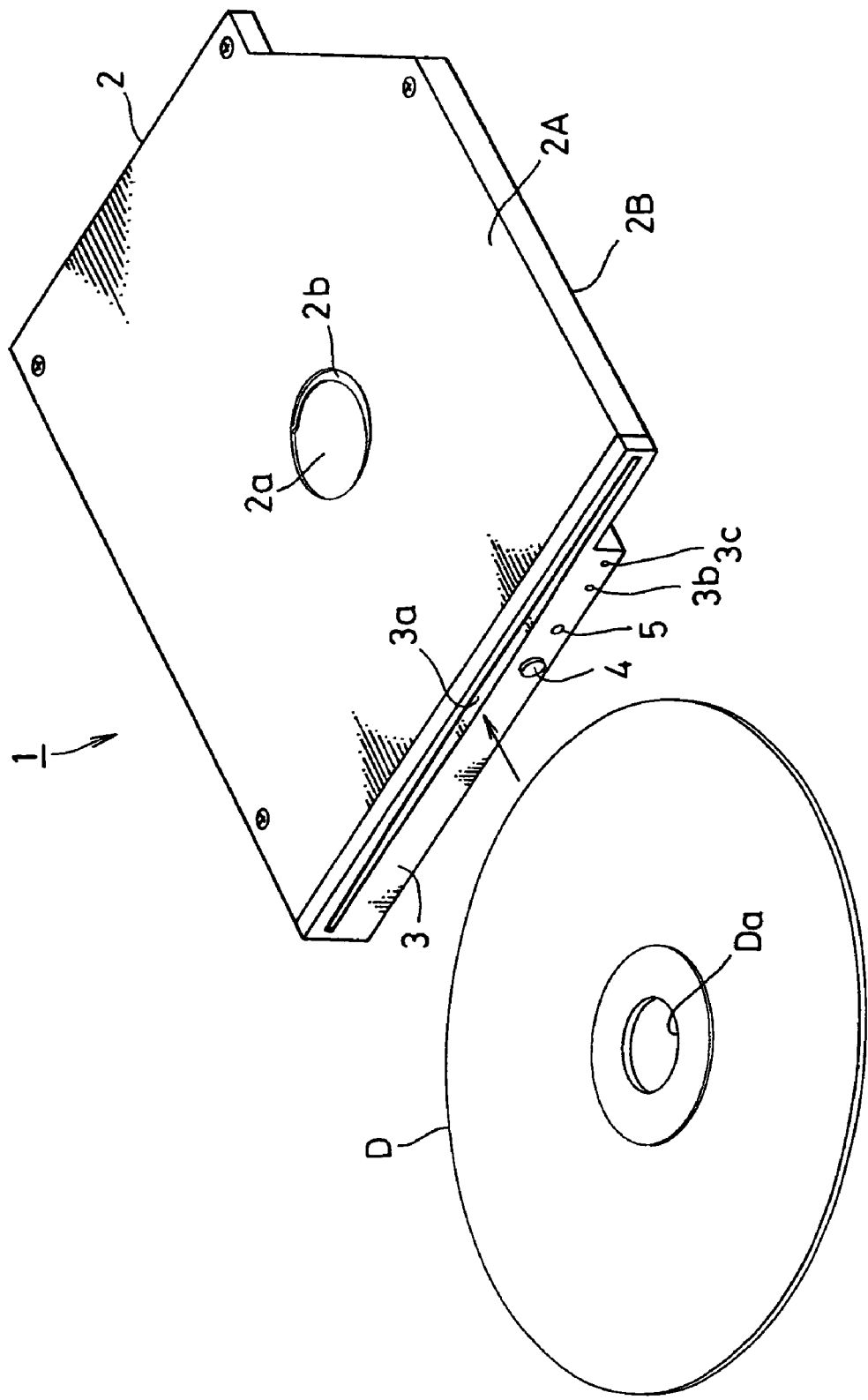
FIG. 1 is a perspective view illustrating an outer appearance of a disk device according to an embodiment of the invention.

FIG. 1 is a diagram illustrating an appearance of a disk device 1 of a slot-in loading type according to an embodiment of the invention. A cover chassis 2A and a bottom chassis 2B are assembled with each other in a shielding state and constitute a chassis case 2. An opening 2a, which a clamp head (which will be described in more detail below) faces, is formed at the center of a top plate of the cover chassis 2A, and a convex portion 2b, which protrudes inside the opening 2a, is formed at a periphery of the opening 2a. A front bezel 3 is disposed at a front end of the chassis case 2. In the front bezel 3, a slot 3a for inserting an optical disk D and through-holes 3b and 3c as an emergency release are formed. In addition, the front bezel 3 has a push button 4 that instructs the loaded optical disk D to be unloaded from the disk device and an indicator 5 that displays an operation state of the disk device 1.

Figure 2:
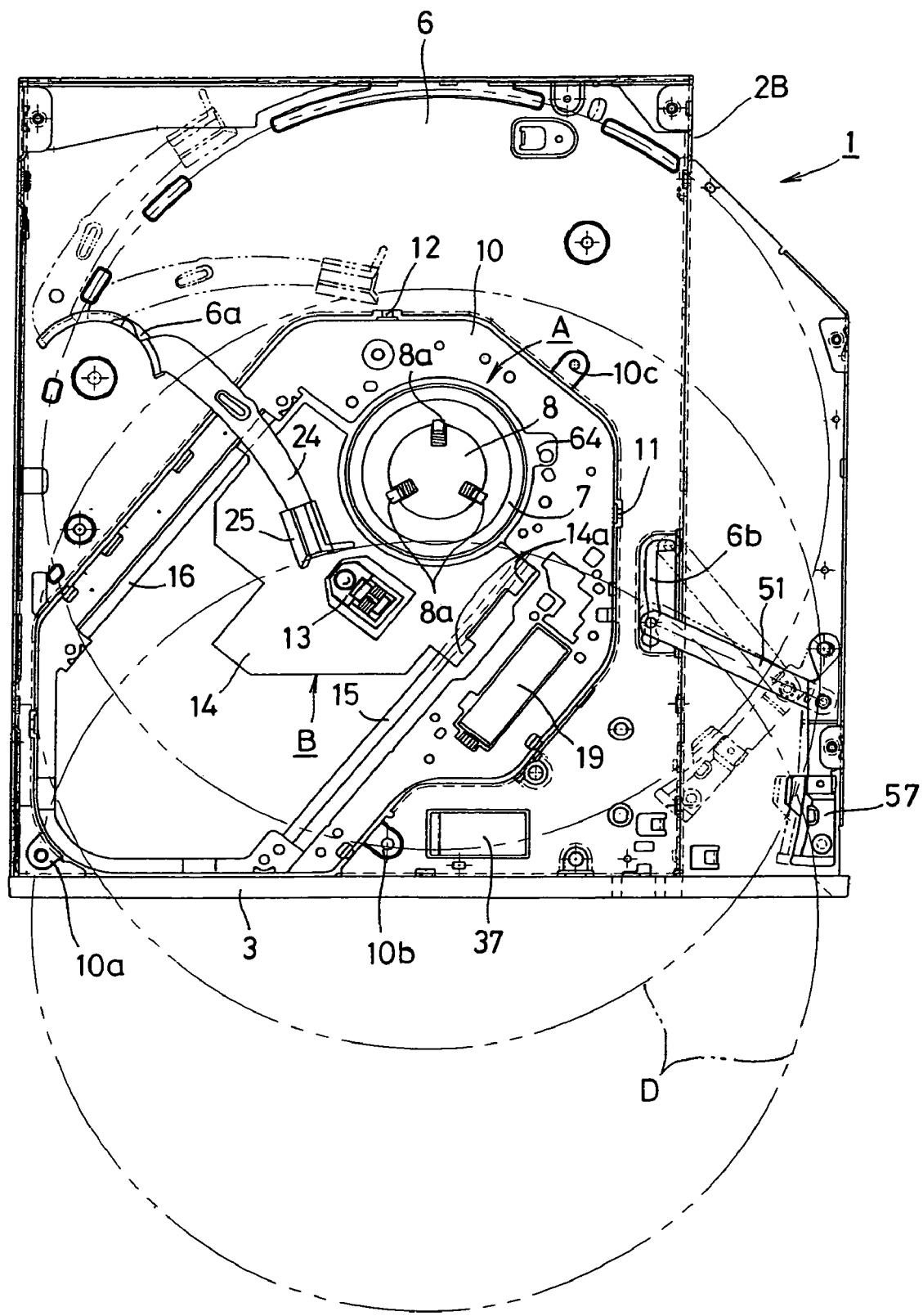
FIG. 2 is a plan view illustrating a state in which a cover chassis is removed from the disk device of FIG. 1.
Figure 3:
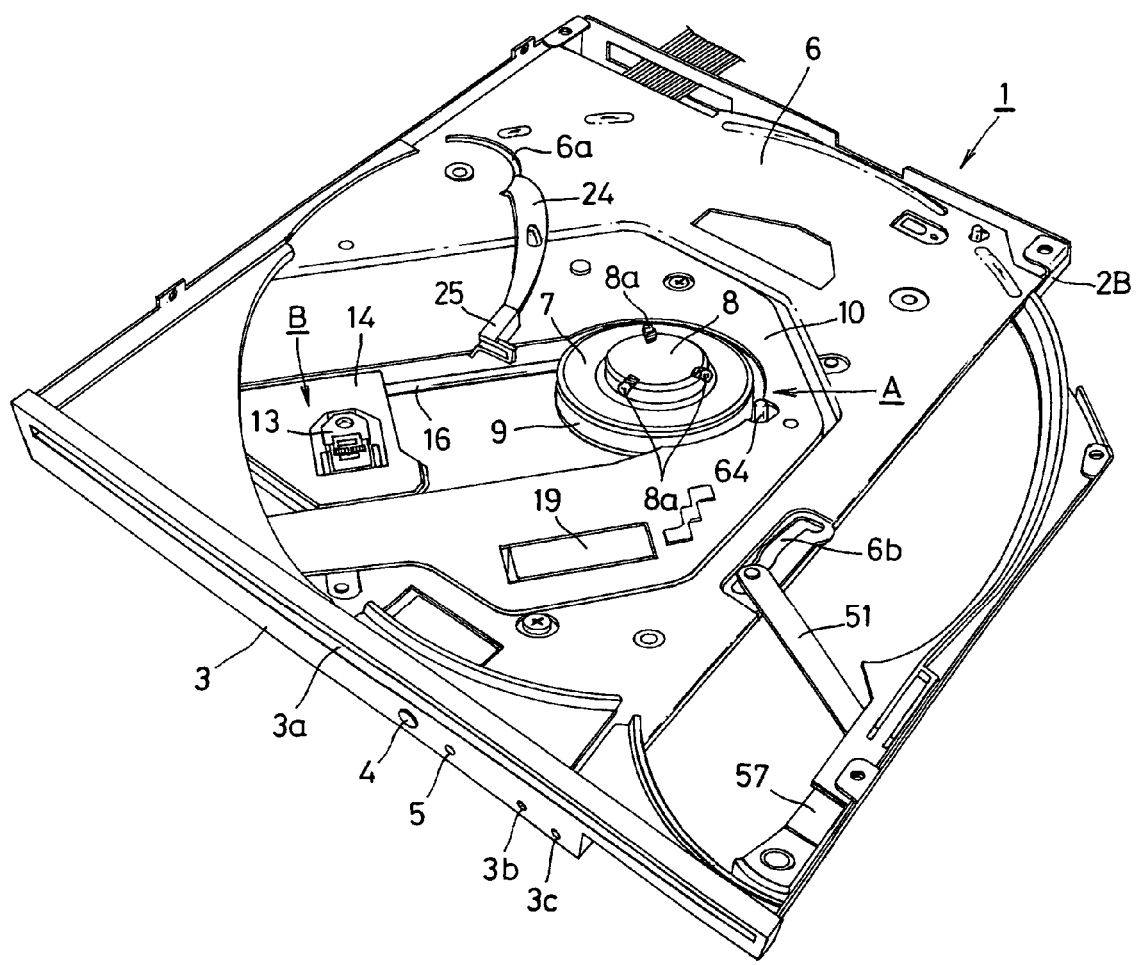
FIG. 3 is a perspective view illustrating a state in which the cover chassis is removed from the disk device of FIG. 1.

FIG. 2 is a plan view illustrating a state in which the cover chassis 2A of the disk device 1 is removed, and FIG. 3 is a perspective view illustrating the state in which the cover chassis 2A of the disk device 1 is removed. In FIGS. 2 and 3, a base panel 6 is disposed on the bottom chassis 2B, and an elevating frame 10 is disposed in a slant direction downward from the center of the base panel, that is, a direction along a diagonal line in the disk device. In the elevating frame 10, a driving system unit A for driving the optical disk D is provided.

The driving system unit A has a structure in which it uses as a main body a spindle motor 9 in which a turn table 7 and a clamp head 8 are fixed to a driving shaft. A supporting plate 9a fixed to the spindle motor 9 is screwed to the elevating frame 10 through a frame member 10d. Accordingly, the elevating frame 10 moves vertically, a central hole Da of the optical disk D is clamped to the clamp head 8, and the optical disk D is held on the turn table 7. In addition, driven pins 11 and 12 fixed to the elevating frame 10 are guided to an elevating mechanism (which will be described in more detail below), so that the vertical movement of the elevating frame 10 is performed.

Figure 4:
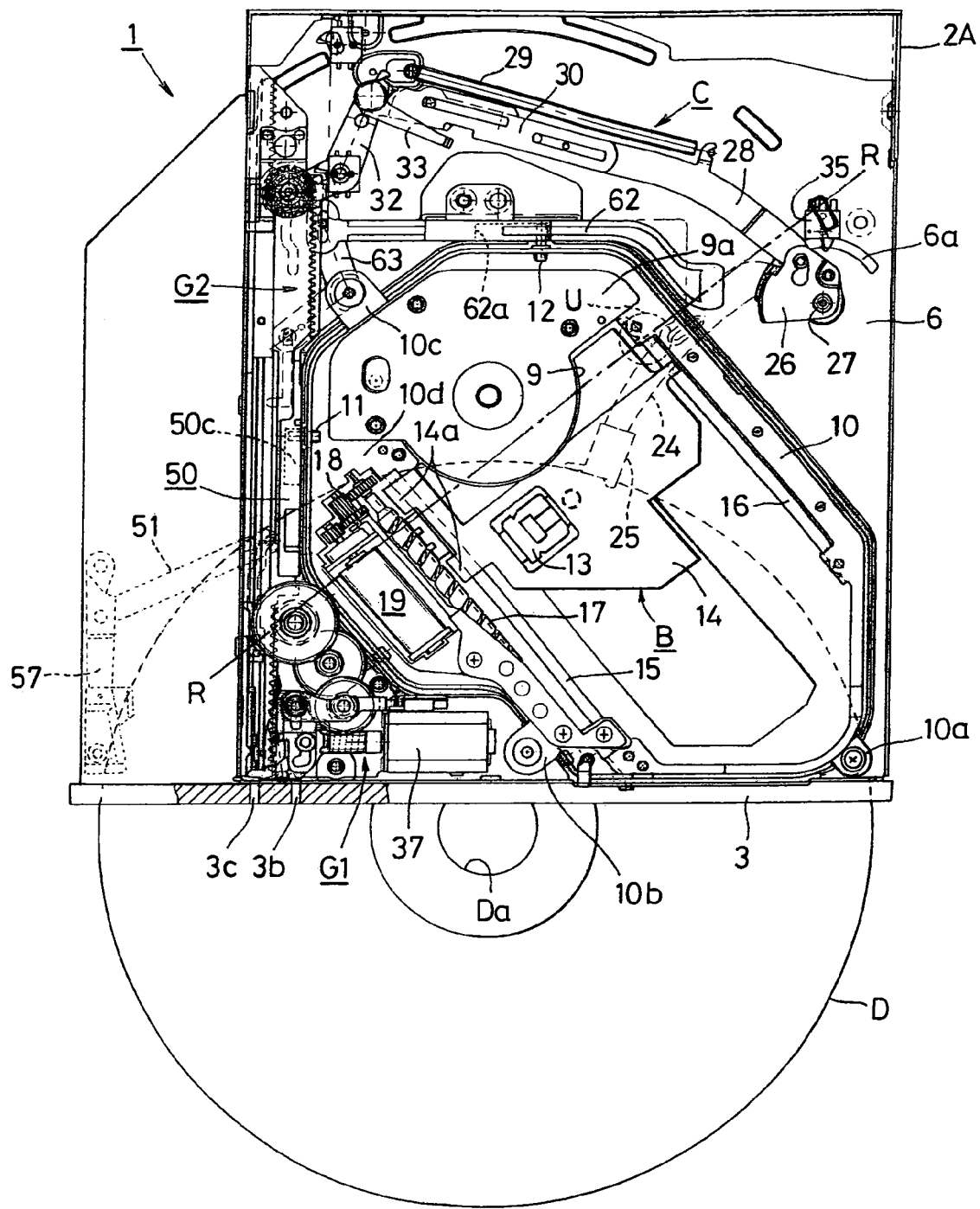
FIG. 4 is a plan view illustrating a state in which a bottom chassis is removed from the disk device of FIG. 1.
Figure 5:
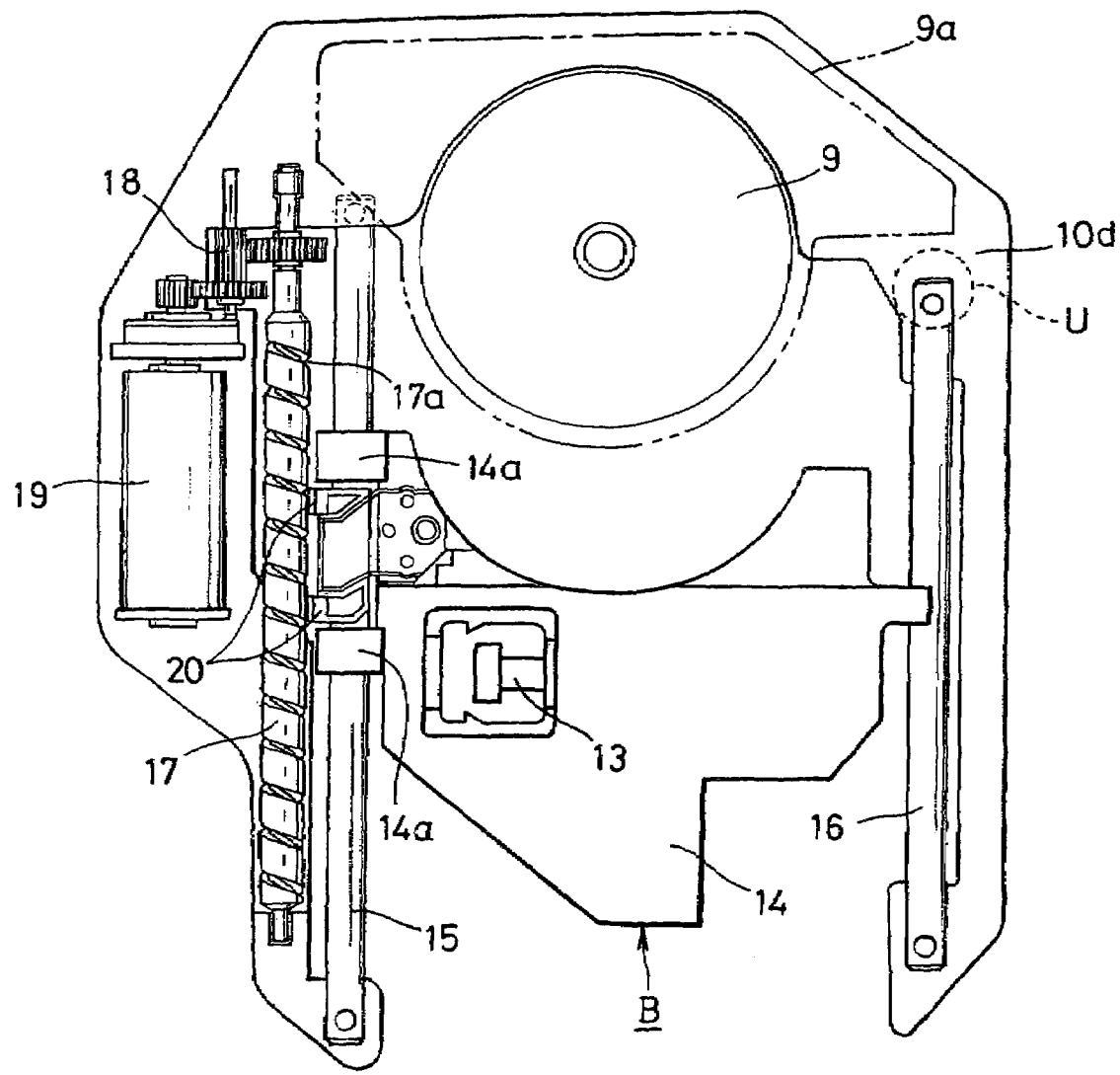
FIG. 5 is a diagram illustrating a driving mechanism that moves a head unit forward and backward.

As shown in FIG. 4, illustrates a state in which the bottom chassis 2B is removed, in the elevating frame 10, a driving mechanism for moving the head unit B forward and backward is disposed, and a structure for essential elements of the driving mechanism is shown in FIG. 5. As shown in FIG. 5, the driving mechanism has a structure in which a carrier block 14 having an optical pickup 13 built therein is supported to guide shafts 15 and 16 fixed to the frame member 10d integrated with the elevating frame 10 and can move forward and backward. In addition, in the elevating frame 10, a screw shaft 17 is disposed parallel to the guide shaft 15. A driving force of a thread motor 19 is transmitted to the screw shaft 17 by a gear train unit 18. Thereby, nuts 20 engaged in lead grooves 17a of the screw shaft 17 are driven, and bearings 14a integrated with the carrier block 14 holding the nuts 20 are guided to the guide shaft 15 and then reciprocate. Therefore, the optical pickup 13 built in the carrier block 14 moves in parallel to a recording surface of the optical disk in accordance with a reciprocating motion of the carrier block 14, so that information recording or reproduction can be achieved.

Figure 6:
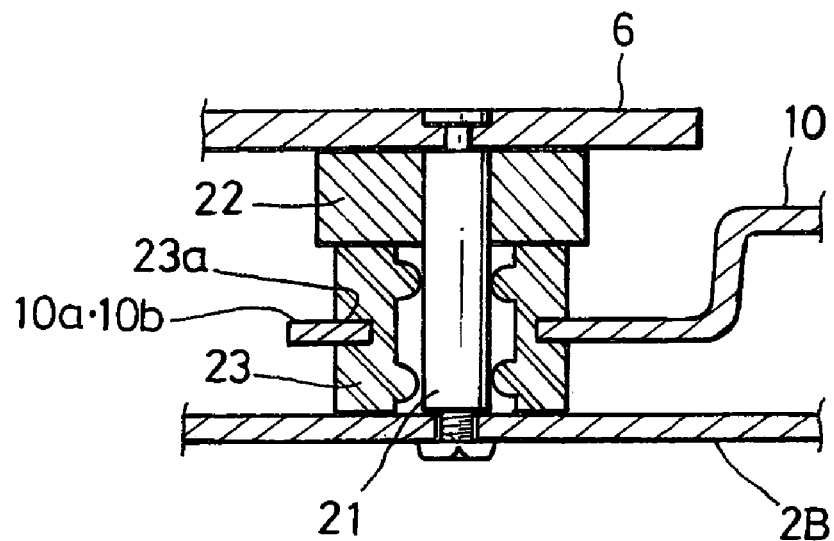
FIG. 6 is a cross-sectional view illustrating a supporting mechanism of an elevating frame.
Figure 7:
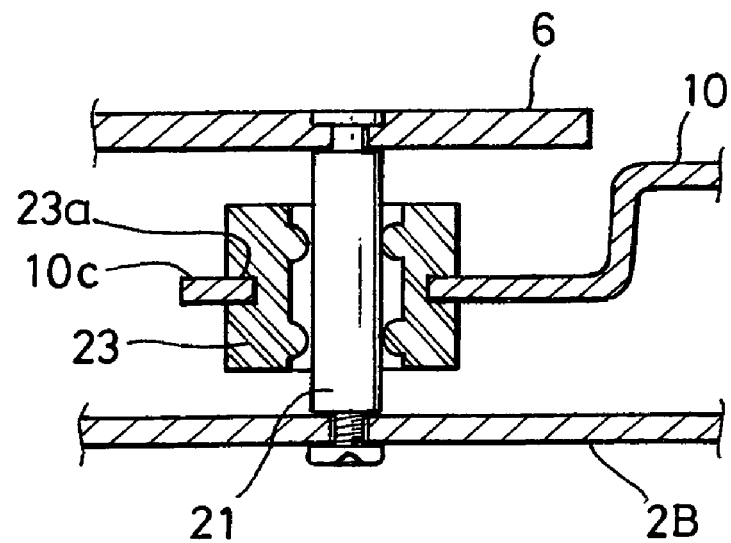
FIG. 7 is a cross-sectional view illustrating the supporting mechanism of the elevating frame.

As described above, by the clamp head 8 which moves in a vertical direction by the elevating frame 10, the central hole Da of the optical disk D is clamped and the clamping state of the central hole Da is released. Therefore, the elevating frame 10 is mounted on the base panel 6 in a floating state by buffering support and can move up and down. That is, in FIG. 4, supporting tongue pieces 10a, 10b, and 10c integrally protrude at three locations of the periphery of the elevating frame 10, and a post pin 21 is erected on a rear surface of the base panel at a corresponding location of the supporting tongue pieces 10a and 10b by a processing such as an end rolling process, as shown in FIG. 6. In addition, a flexible buffering member 23 is mounted on the post pin 21 with a spacer 22 interposed therebetween, and the supporting tongue pieces 10a and 10b are mounted in a groove 23a formed in the buffering member 23. In contrast, as shown in FIG. 7, the supporting tongue piece 10c is supported by only the buffering member 23 which is mounted on the post pin 21 without the spacer inserted therebetween, and has a larger stroke of the vertical movement than the supporting tongue pieces 10a and 10b such that the elevating frame 10 can be rocked. In addition, the other end of the post pin 21 is screwed to the bottom chassis 2B.

Figure 8:
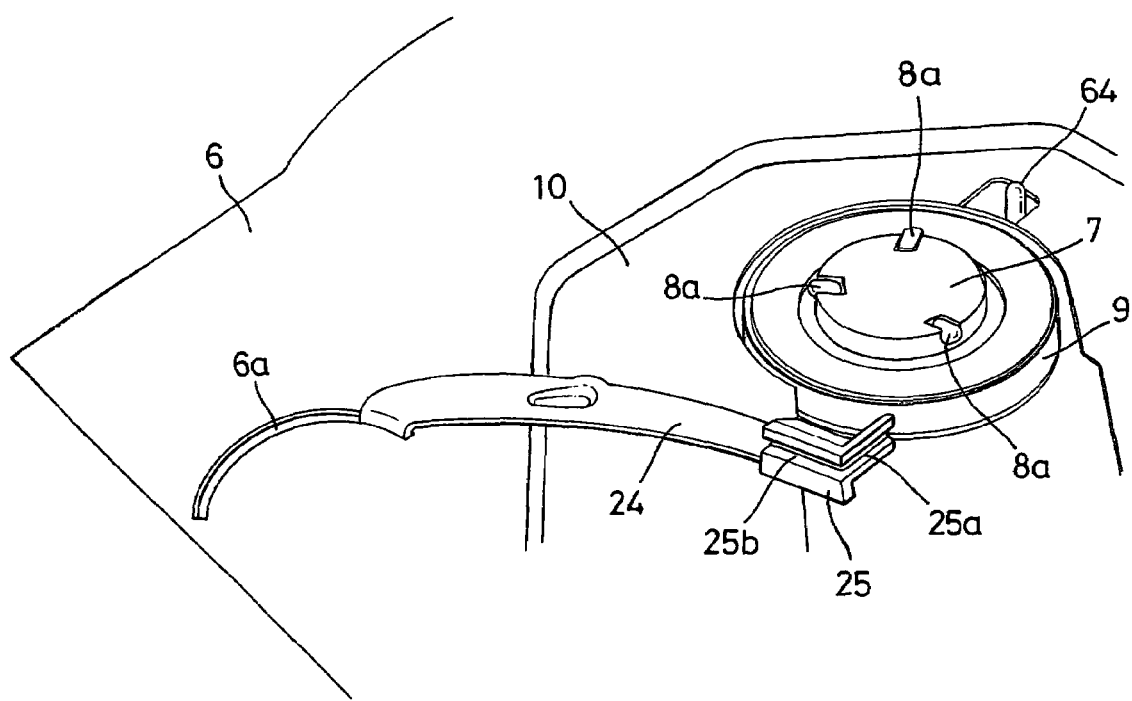
FIG. 8 is a perspective view illustrating a structure of a disk supporting frame.

Next, the driving mechanism C, which serves to load the optical disk D on the disk device or unload the optical disk from the disk device, will be described. An end portion, which becomes the rocking supporting point of a disk supporting arm 24 having a holder 25 provided at a front end, is integrated with a supporting plate 26 at the rear surface side of the base panel 6, as shown in FIG. 4, and the supporting plate 26 can be pivotally supported by a pivoting pin 27 so as to rotate. The disk supporting arm 24 provided on the base panel 6 is rocked within a range of a slit 6a in accordance with the rotation of the supporting plate 26. The holder 25 of the disk supporting arm 24 has the front end in provided with an end receiving portion 25a and the side formed with a holding groove 25b, as shown in FIG. 8.

Figure 9:
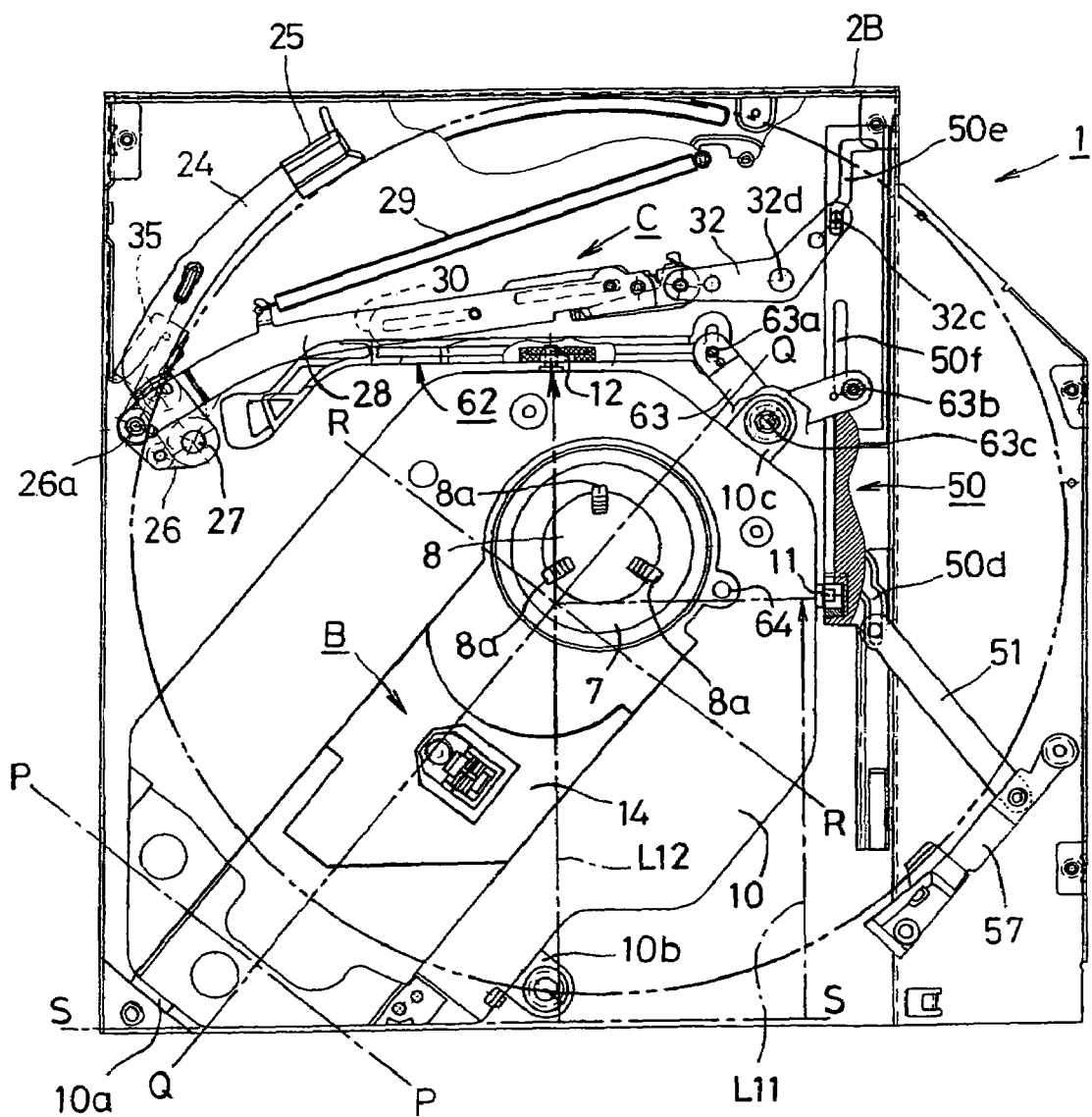
FIG. 9 is a plan view illustrating a driving mechanism of the disk supporting frame.
Figure 10:
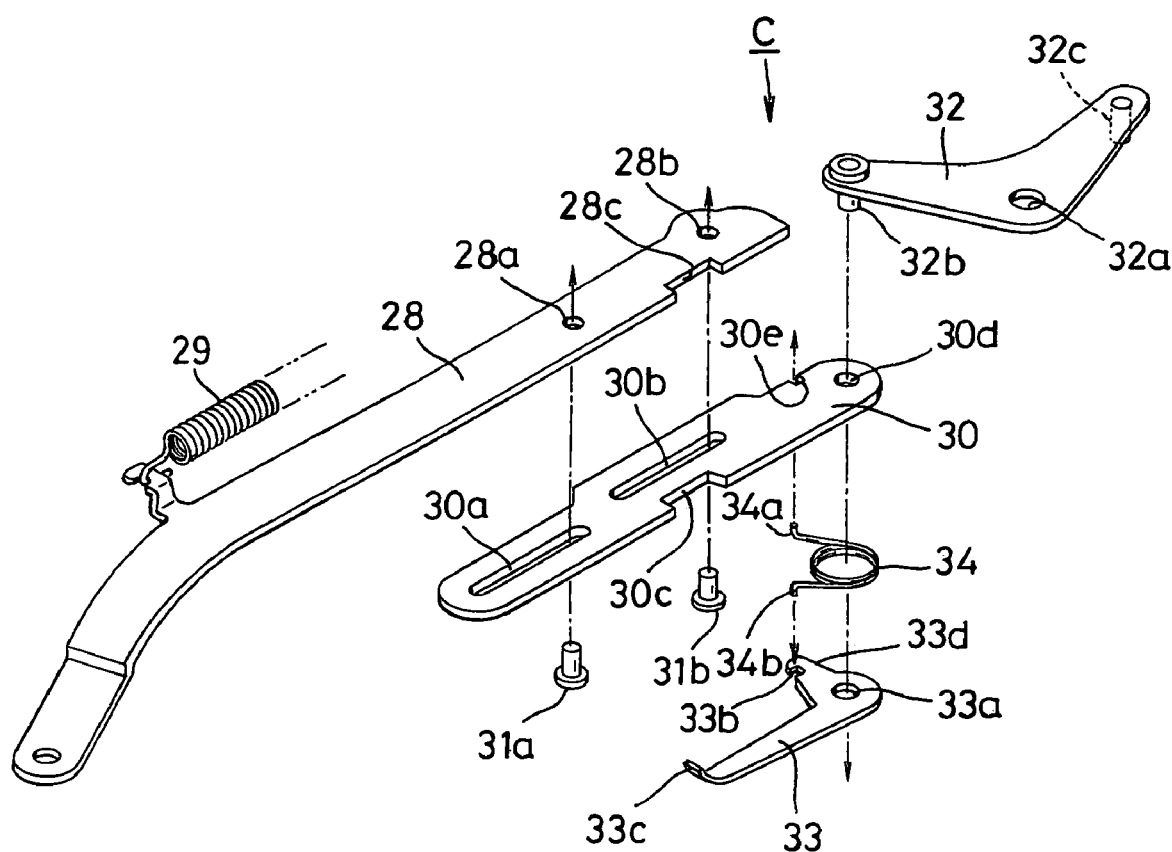
FIG. 10 is an exploded perspective view illustrating essential elements of the driving mechanism of the disk supporting frame.

FIG. 9 illustrates a case in which the base panel 6 is removed in a state in which the driving mechanism C of the disk supporting arm 24 is constructed. In FIG. 9, a first ring arm 28, which directly drives the disk supporting arm 24, is connected to the disk supporting arm 24 by the pivoting pin 26a of the supporting plate 26, and is always biased by means of a tensile coil spring 29. On the other hand, as shown in FIG. 10, slits 30a and 30b are formed in a second ring arm 30, rivet pins 31a and 31b are inserted in the slits 30a and 30b, and front ends of the rivet pins 31a and 31b are fixed in through-holes 28a and 28b of the first ring arm 28. Therefore, the first ring arm 28 and the second ring arm 30 can expand and contract within a range of the slits 30a and 30b. In addition, in the first and second ring arms 28 and 30, notch portions 28c and 30c are formed in which a locking mechanism (which will be described in detail below) acts.

Reference numeral 32 indicates a lever arm which transmits a driving force to the second ring arm 30, and the through-hole 32a serving as a supporting point is pivotally supported by the pivoting pin 32d such that the lever arm can be rocked. The pivoting pin 32b is fixed to the action end of the lever arm 32, and the pivoting pin 32b is inserted in a through-hole 30d of the second ring arm 30 and a through-hole 33a of a locking lever 33. In addition, a twisted coil spring 34 is disposed between the second ring arm 30 and the locking lever 33 and has its one end 34a locked to a notch portion 30e of the second ring arm 30 and the other end locked to a notch portion 33b of the locking lever 33.

Thereby, a locking end 33c of the locking lever 33 is biased in a direction where it is locked to the notch portion 28c of the first ring arm 28 and the notch portion 30c of the second ring arm 30. In addition, a mirror switch 35, which is operated after the switch lever 35a is pressed at the rear end thereof when the first ring arm 28 forms a predetermined angle, is disposed on the rear surface of the base panel 6. In addition, a driving pin 36, which presses on the rear end 33d of the locking lever 33 when the second ring arm reaches a predetermined location, is erected on the bottom chassis 2B.

Next, a structure of a carrying mechanism and a slider mechanism, which become the motive power transmitting elements of the disk supporting arm 24 to the driving mechanism C, will be described. Assembling a loading gear unit G1 and a rack gear unit G2 with each other construct the carrying mechanism. First, a structure of the loading gear unit G1 and its operation will be described with reference to FIGS. 11A to 11C and FIGS. 12A to 12C. In these drawings, reference numeral 37 indicates a loading motor that becomes the motive power source. A worm gear 38 is fixed to an output shaft of the loading motor 37 so as to rotate about the same shaft, and a rotation force of the worm gear 38 is sequentially transmitted to double gears 39, 40, and 41 pivotally supported by a gear base 42 while the transmitting speed of the rotation force decreases from a small-diameter gear to a large-diameter gear.

Figure 11A:
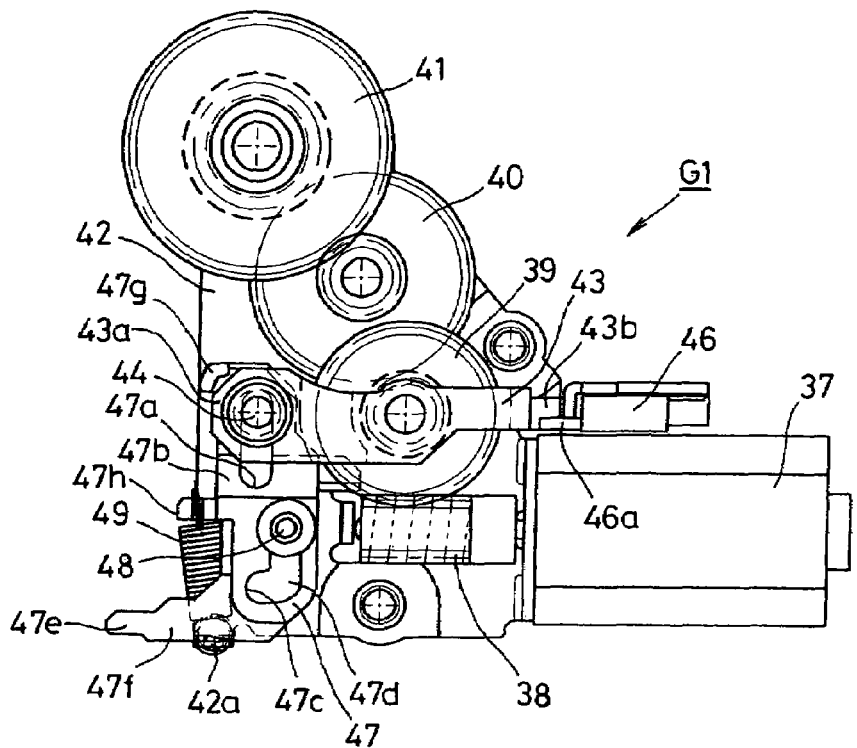
FIGS. 11A to 11C are diagrams illustrating a structure of a disk carrying mechanism.
Figure 11B:
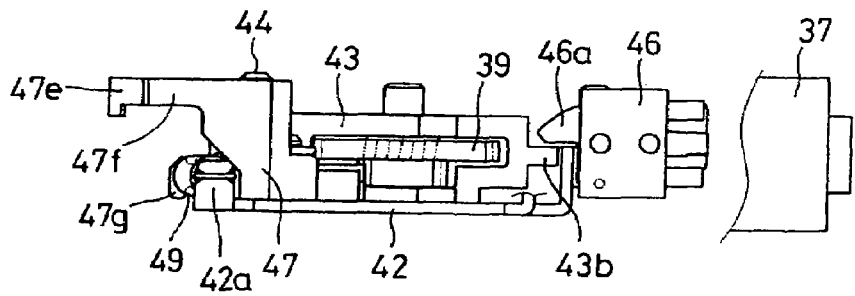
Figure 11C:
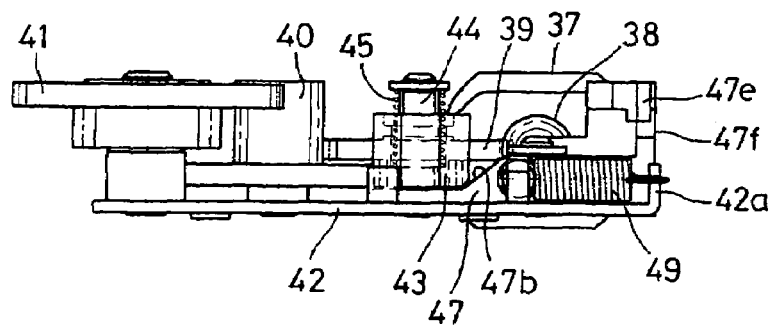

In the structure of the gears, the double gear 39 has a release mechanism which releases an engagement state with the worm gear 38. The holder 43 can slide in a vertical direction while holding the double gear 39. The end 43a of the holder 43 is inserted in the pivoting pin 44, and is biased downward by a compression coil spring 45 and is then pivotally supported by it. As a result, in a normal state, the worm gear 38 and the double gear 39 enter a normal engagement state, as shown in FIG. 11C. In addition, at the end of the holder 43 located at the loading motor 37 side, a dog head 43b is formed and can operate a knob 46a of the mirror switch 46 fixed to the gear base 42.

A slider member 47 pivotally supported to the same shaft as the pivoting pin 44 is provided on the bottom surface of the end 43a of the holder 43. An elongated groove 47a is formed in a portion of the slider member 47 pivotally supported by the pivoting pin 44, and the slider member 47 can slide in a direction which forms a right angle with respect to the end 43a of the holder 43. In addition, the slider member 47 has an inclined surface 47b formed between a front end and a rear end. When the slider member 47 moves forward, the inclined surface 47b pushes up the end 43a of the holder 43 from the bottom surface, and the entire holder 43 is raised.

Further, an elongated groove 47d is formed at the rear end of the slider member 47 in which it has a locking step 47c pivotally supported to the pivoting pin 48. Furthermore, an action piece 47f having a sealing protrusion 47e is formed at a rear end of the slider member 47 farther than the rear end. On the other hand, at the front end of the slider member 47, a reset piece 47g driven according to the driving of the rack gear unit G2 is formed.

As such, in the slider member 47 which is integrally formed, a tensile coil spring 49, which gives a toggle action between a hook piece 47h and a hook piece 42a of the gear base 42, is provided so as to extend at an inclined angle. The slider member 47 is biased so as to rotate in a counterclockwise direction while always moving backward.

Figure 12A:
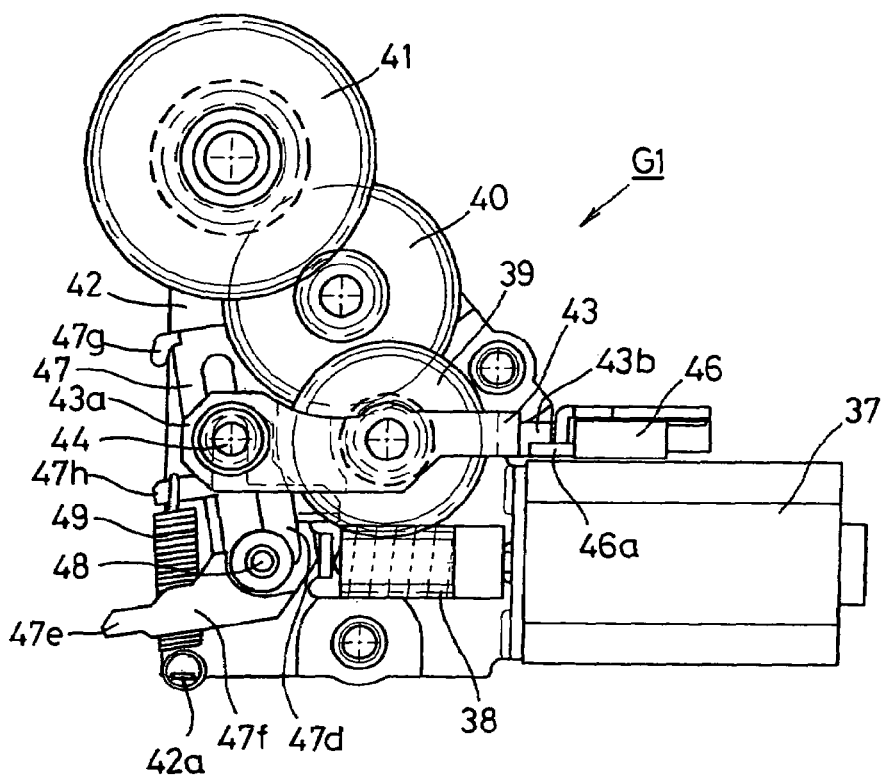
FIGS. 12A to 12C are diagrams illustrating a structure of a disk carrying mechanism.
Figure 12B:
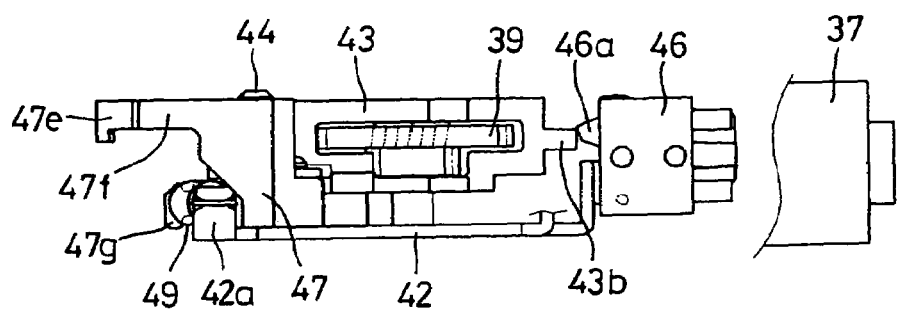
Figure 12C:
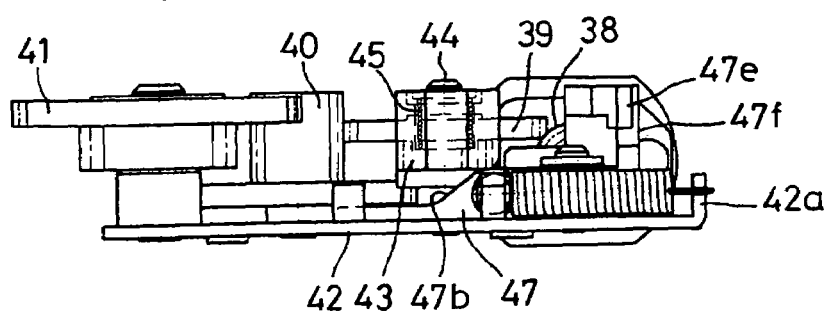

As described above, the slider member 47 is constructed, and the slider member 47 uses the pivoting pin 44 as a supporting point in a normal state shown in FIG. 11. In this state, if the slider member 47 is pressed from its rear end so as to move forward and the locking step 47c of the elongated groove 47d reaches a location of the pivoting pin 48, the slider member 47 rotates while using the pivoting pin 44 as a supporting pin by the tension of the tension coil spring 49. As shown in FIGS. 12A, 12B, and 12C, the locking step 47c and the pivoting pin 48 are engaged with each other to enter a locking state, and maintain a locking state.

Figure 13:
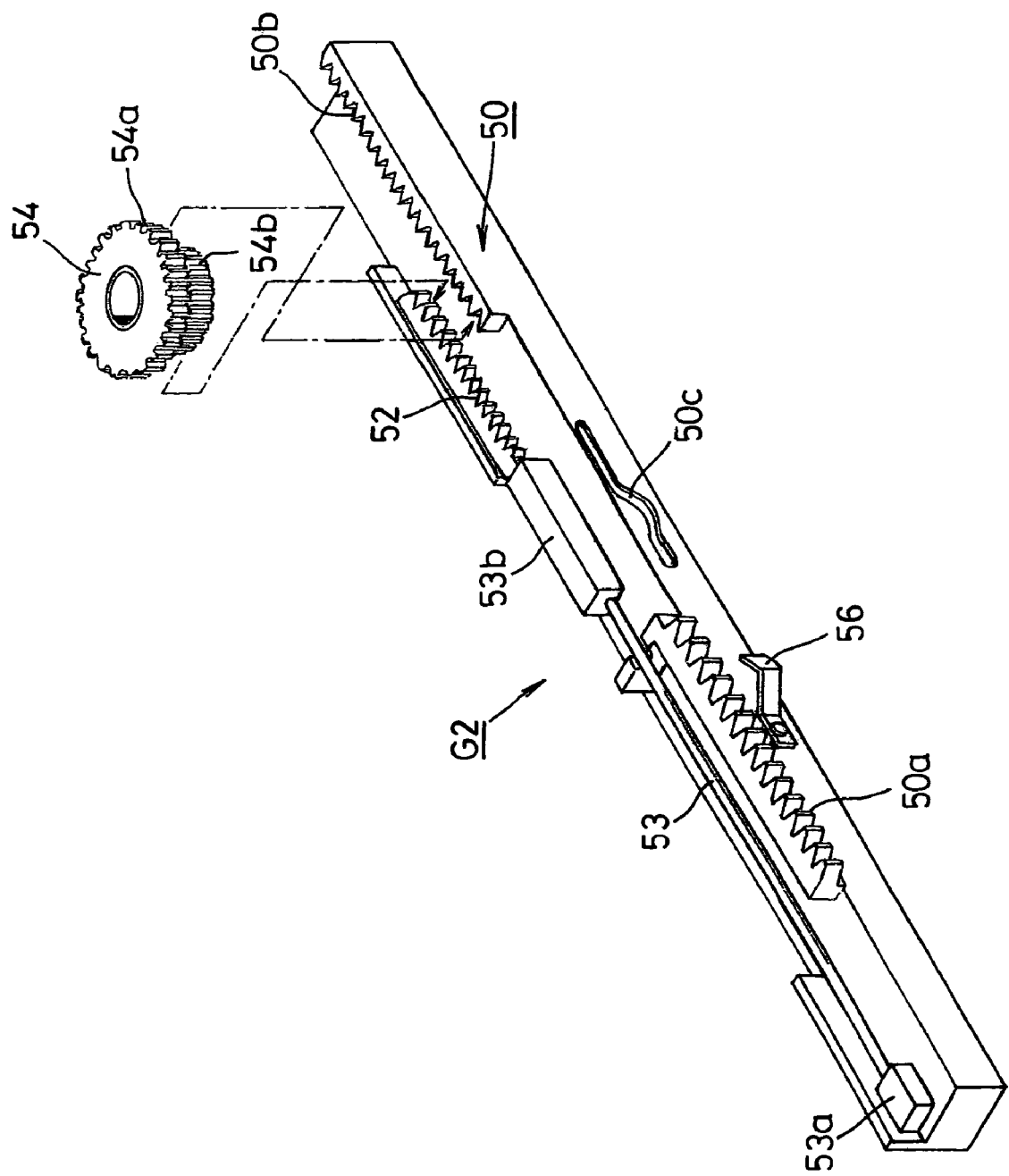
FIG. 13 is a perspective view illustrating a structure of a rack gear unit.

Next, as shown in FIG. 13, in the rack gear unit G2, gear trains 50a and 50b are integrally formed in a rack main body 50, and the gear train 50a is engaged with a small-diameter gear of the double gear 41 of the loading gear unit G1. Therefore, by driving the loading motor 37, the rack main body 50 moves forward and backward in the chassis case 2. As such, the rack main body 50 moves forward and backward, so that the driving mechanism C connected to the front end of the rack main body 50 is driven and the disk supporting arm 24 is rocked. In addition, a guiding arm 57 is rocked by the lever arm 51 that is connected to the rack main body 50 on the surface of the base panel 6 shown in FIG. 2.

On the rack main body 50 constructed in this way, the gear member 52, which moves forward and backward at the front end of the rack main body 50, is disposed in a freely moving state. In addition, since the gear member 52 moves forward by the pressing operation, a pressing pin 53, which has blocks 53a and 53b formed at the front and rear ends, is disposed on the rack main body 50. In addition, the gear train 50b and the gear member 52 are engaged with the double gear 54 provided in the gear frame 55 so as to freely rotate, and they are connected to the double gear 54. In this case, a large-diameter gear 54a of the double gear 54 is engaged with the rear end of the gear train 50b, and the small-diameter gear 54b is engaged with the front end of the gear member 52 which is integrally formed together with the block 53b.

Accordingly, if the gear member 52 is pressed by an external force through the pressing pin 53, since the double gear 54 rotates at a predetermined location, the rotation force of the large-diameter gear 54a is transmitted to the gear train 50b, which moves the rack main body 50. In addition, reference numeral 56 indicates an action piece for pressing on the reset piece 47g formed at the front end of the slider member 47 of the above-mentioned loading gear unit G1. In a state shown in FIG. 12, if the action piece 56 presses on the reset piece 47g of the slider member 47, since the engagement state between the pivoting pin 48 and the locking stage 47c is released, the loading gear unit G1 returns to a state shown in FIG. 11.

Figure 14:
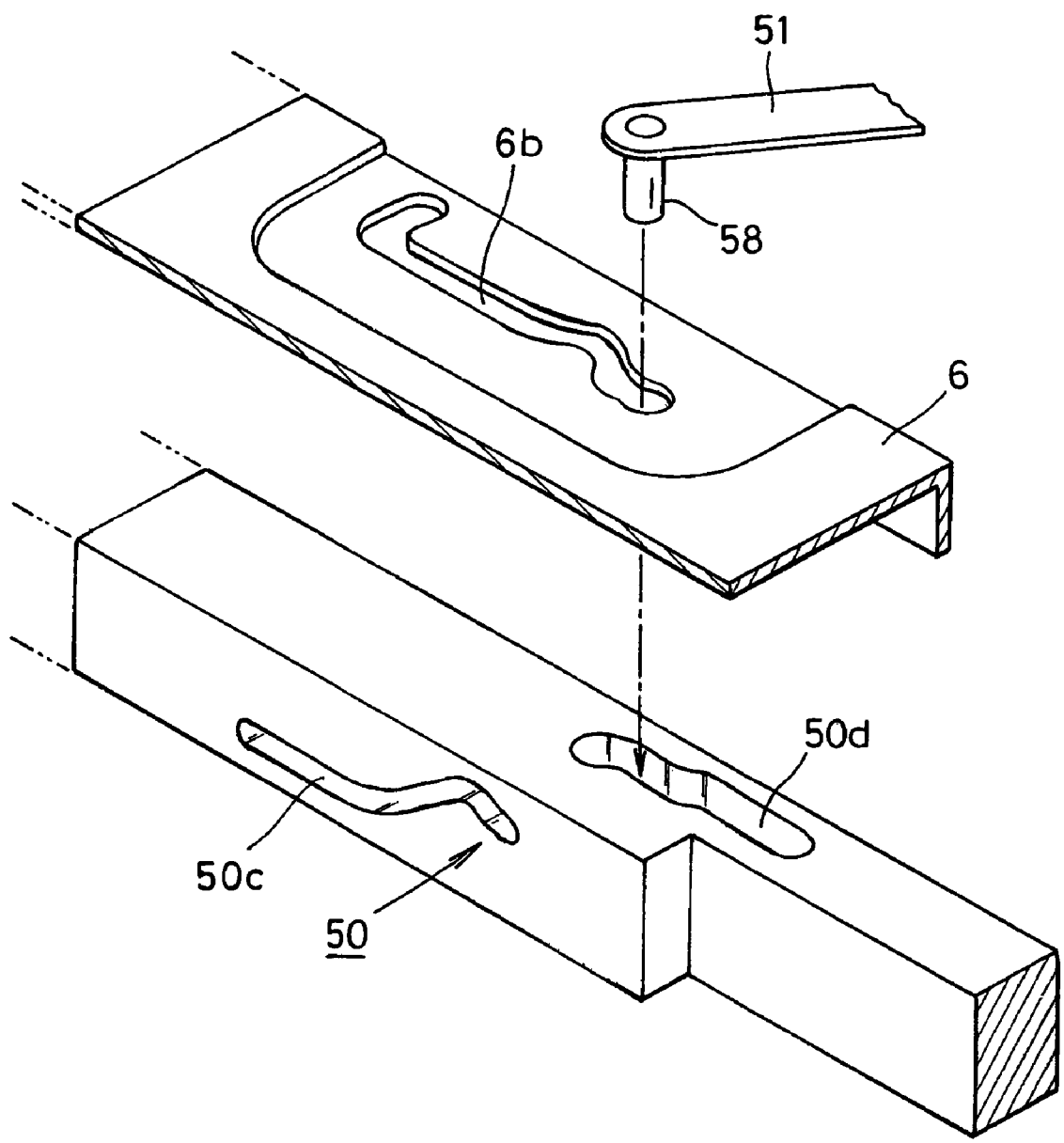
FIG. 14 is an exploded perspective view illustrating a structure for driving a guide arm.

Next, the structure of the guiding arm 57 driven by the rack main body 50 and its operation aspect will be described below. FIG. 14 is a diagram illustrating the structure for driving the guiding arm 57. In this case, a guide slit 6b is formed in a portion of the base panel 6 corresponding to the guide groove 50d formed in the rack main body 50, and a driven pin 58 fixed to a front end of the lever arm 51 is inserted in the guide groove 50d and the guide slit 6b. The operation of the driven pin 58 is controlled in accordance with the interaction between the guide groove 50d and the guide slit 6b formed at the location corresponding to the guide groove where the driven pin moves forward and backward.

Figure 15:
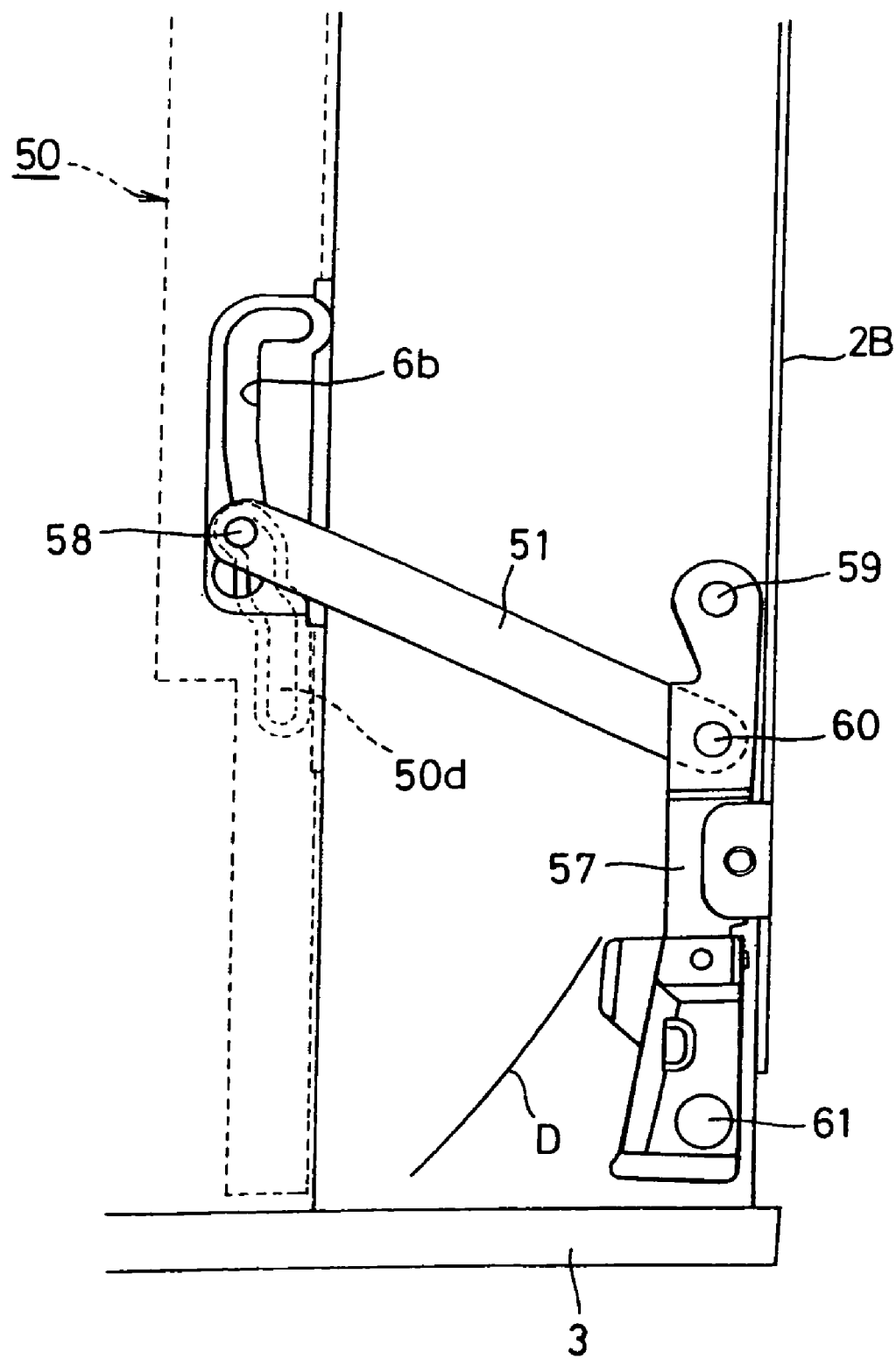
FIG. 15 is a first process diagram illustrating a driving aspect of the guide arm.

As shown in FIG. 15, in the guiding arm 57, the lever arm 51 is pivotally supported by the pivoting pin 60 at the base end which is rotatably supported to the pivoting pin 59. A holding groove of the optical disk D is formed in the front end of the guiding arm 57, and the roller 61 is disposed in the holding groove. Since the guiding arm 57 has the above-mentioned structure, it is rocked in the chassis case 2 according to the operation of the lever arm 51, and it is possible to load the optical disk D in the disk device.

FIGS. 15 to 19 show the operation aspect of the guiding arm 57. FIG. 15 shows a state in which the operator inserts the optical disk D into the disk device 1. This state is the initial state in which the disk supporting arm 24 is pushed back at the front end side of a loading direction of the optical disk D and is then rocked backward, the first ring arm 28 operates the limit switch 35 and the driving mechanism C starts the operation. Accordingly, as shown in FIG. 15, the rack main body 50 is located at the most front end and the lever arm 51 is located at the rear end of the guiding groove 50d.

Figure 16:
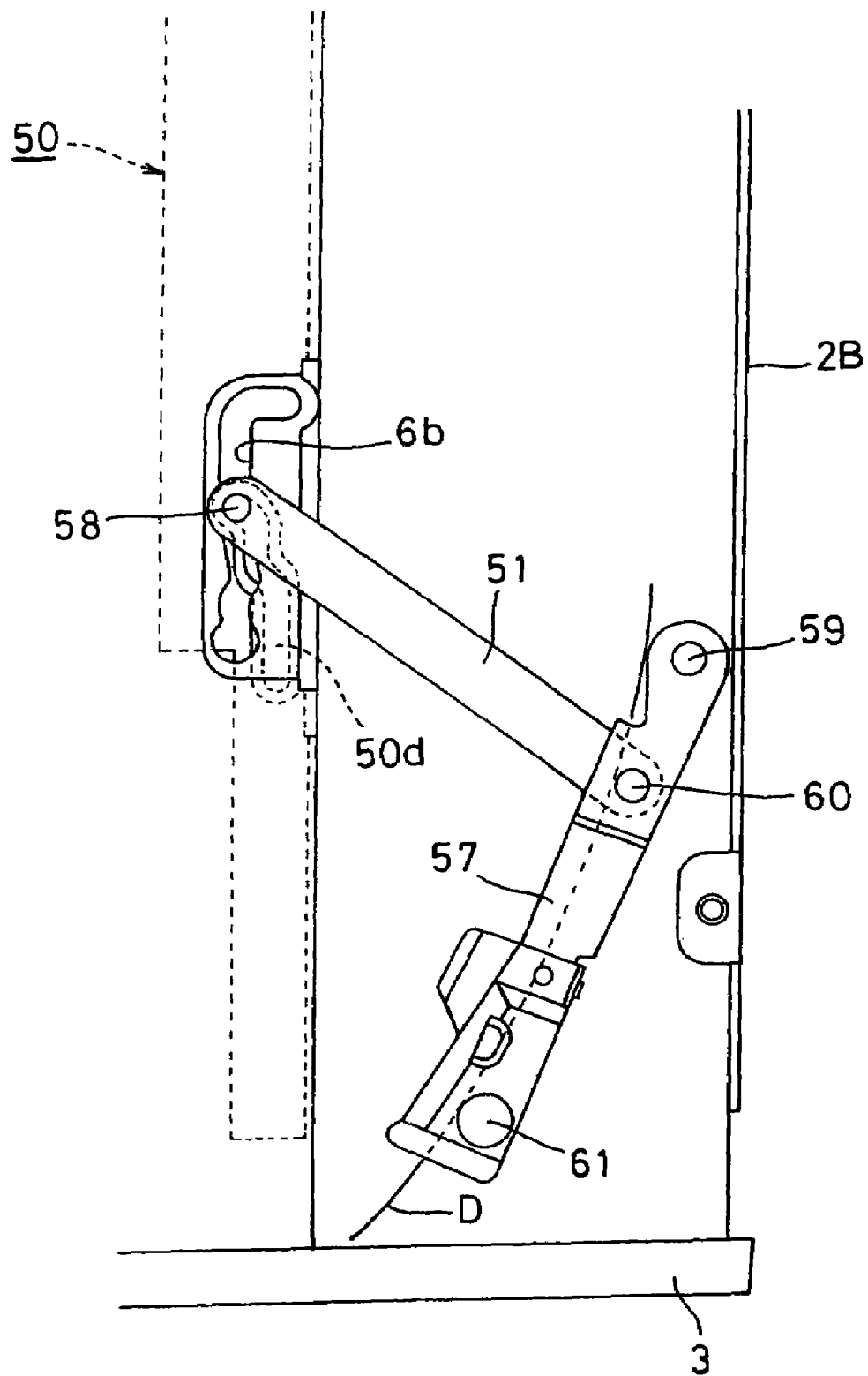
FIG. 16 is a second process diagram illustrating a driving aspect of the guide arm.

In this state, if the driving mechanism C starts the operation, the rack main body 50 starts to move backward, as shown in FIG. 16. At this time, since the driven pin 58 is interposed between the inclined surface of the rear end of the guiding groove 50d and the sidewall of the guide slit 6b, the driven pin 58 moves backward when the rack main body 50 moves forward. The lever arm 51 is pulled, so that the guiding arm 57 is rocked. As a result, the holder 25 of the disk supporting arm 24 and the guiding arm 57 holds the optical disk D, and the loading of the optical disk starts.

Figure 17:
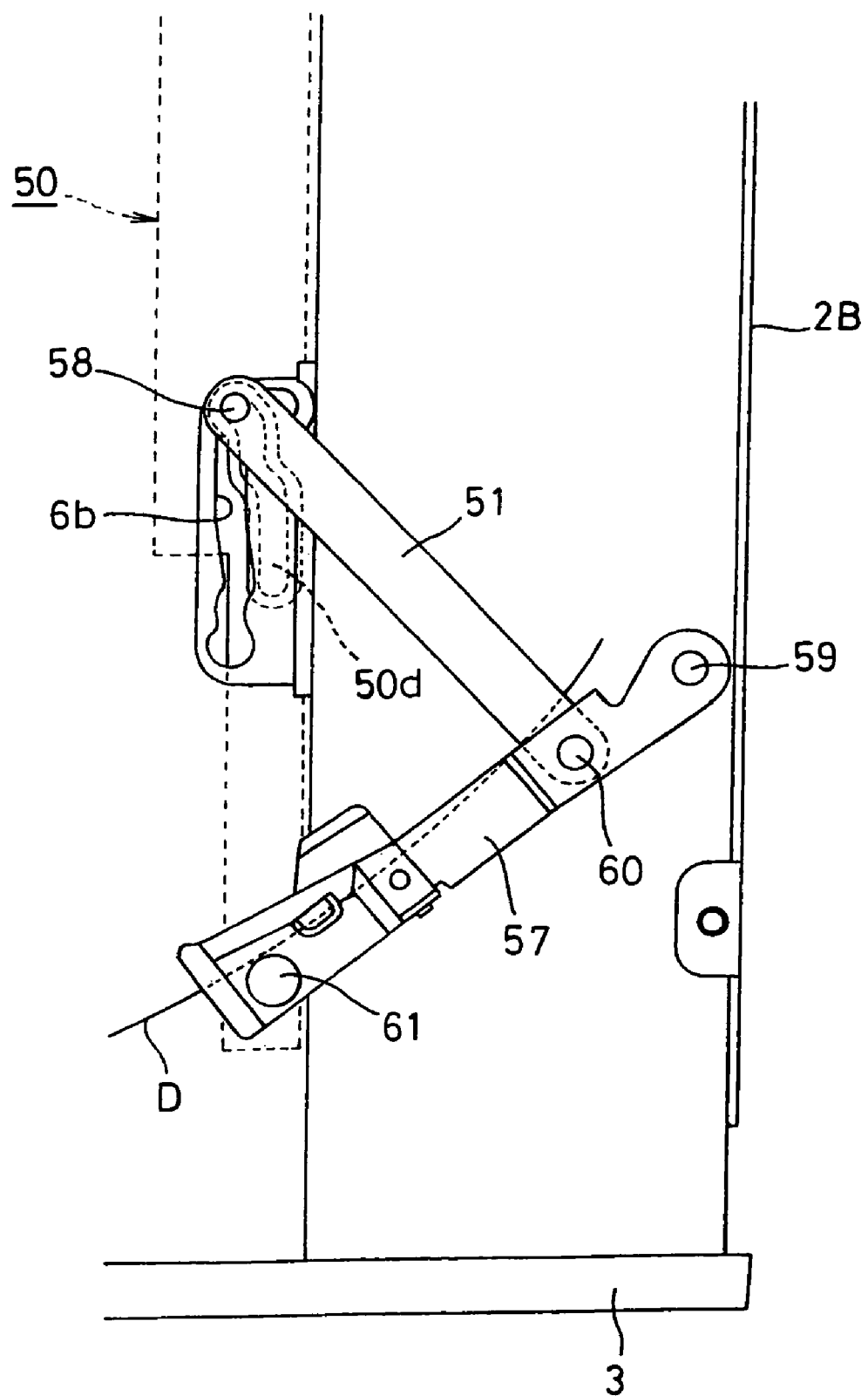
FIG. 17 is a third process diagram illustrating a driving aspect of the guide arm.
Figure 18:
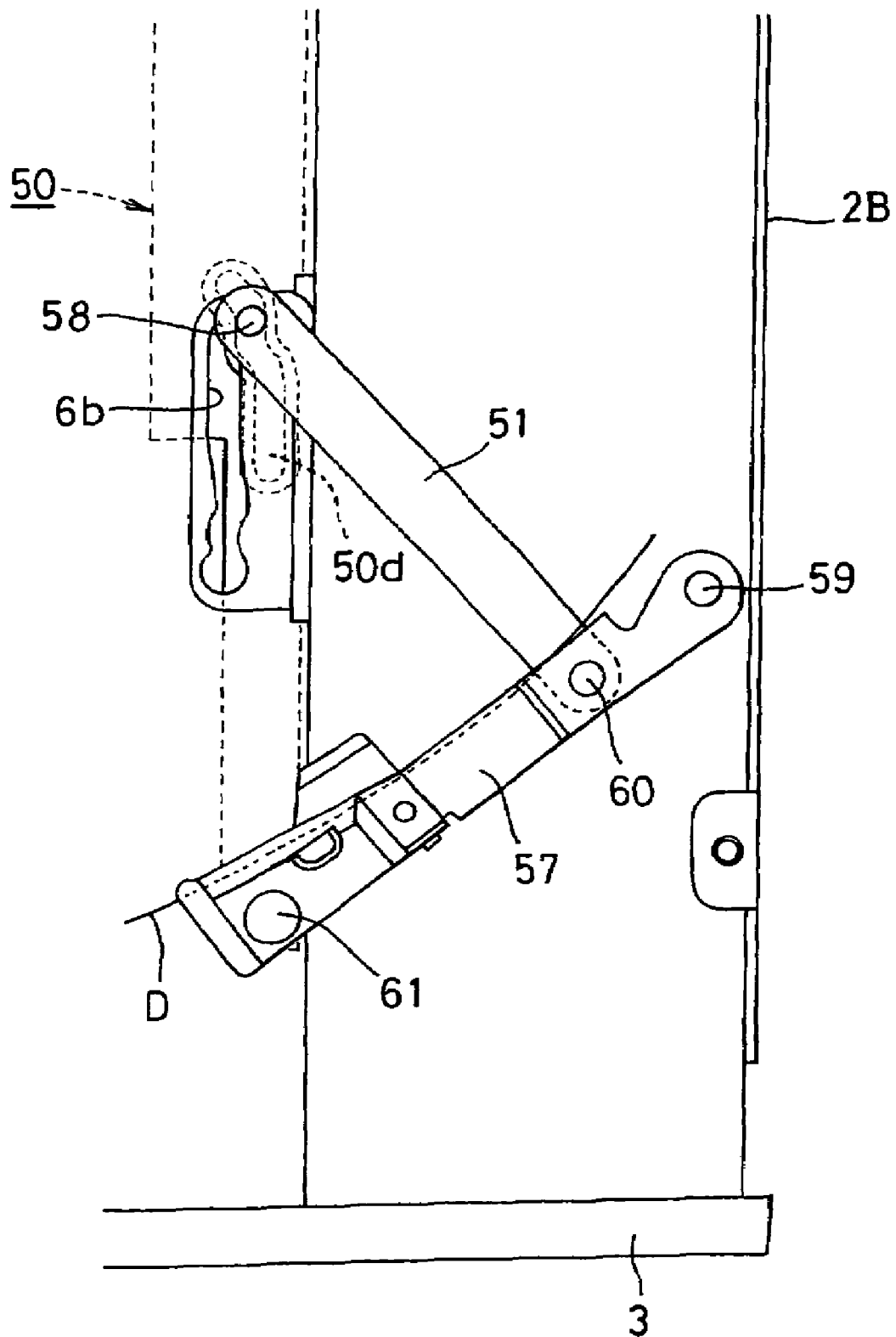
FIG. 18 is a fourth process diagram illustrating a driving aspect of the guide arm.

FIG. 17 shows a state in which the rack main body 50 further moves backward and the driven pin 58 reaches the top portion of the guide slit 6b. In this case, the optical disk D is continuously loaded in the disk device by rocking of the guiding arm 57, and the central hole Da of the optical disk D reaches the same location as the clamp head 8. FIG. 18 shows a state in which the rack main body 50 slightly moves backward from the location of FIG. 17. In this case, the driven pin 58 is inserted in a horizontal groove of the top groove of the guide slit 6b by the guide groove 50d.

Figure 19:
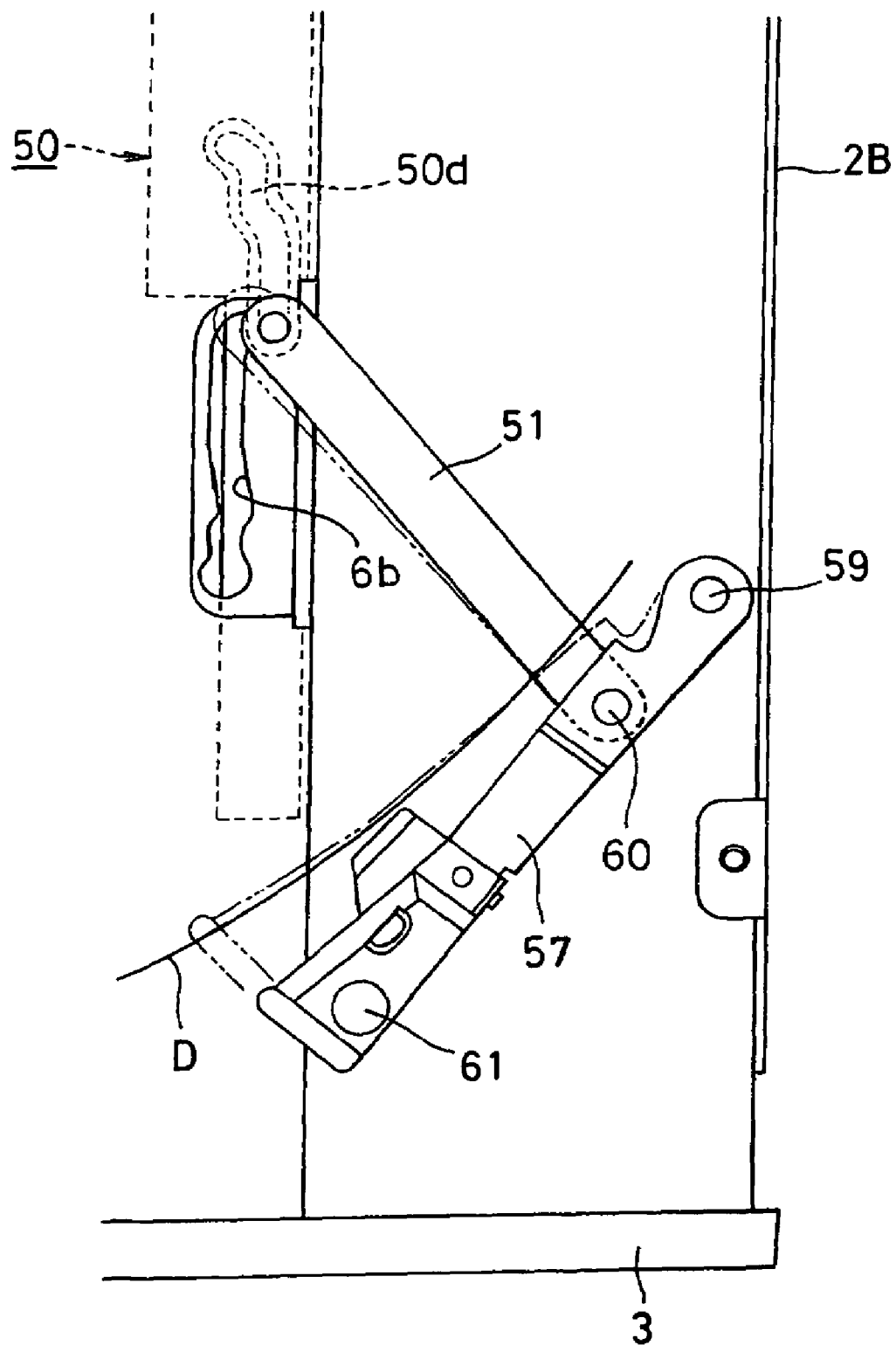
FIG. 19 is a fifth process diagram illustrating a driving aspect of the guide arm.

FIG. 19 shows a state in which the rack main body 50 moves backward to a final location. In the course reaching from FIGS. 18 to 19, the driven pin 58 is inserted in the horizontal groove of the top portion of the guide slit 6b by the elongated groove of the front end of the guide groove 50d. Thereby, the guiding arm 57 moves slightly backward from the location indicated by the virtual line in the drawings, and the holding of the optical disk D is released. In a series from FIGS. 16 to 19, the central hole Da of the optical disk D is clamped to a clamp head 8 and the optical disk D is held on the turn table 7.

Figure 20:
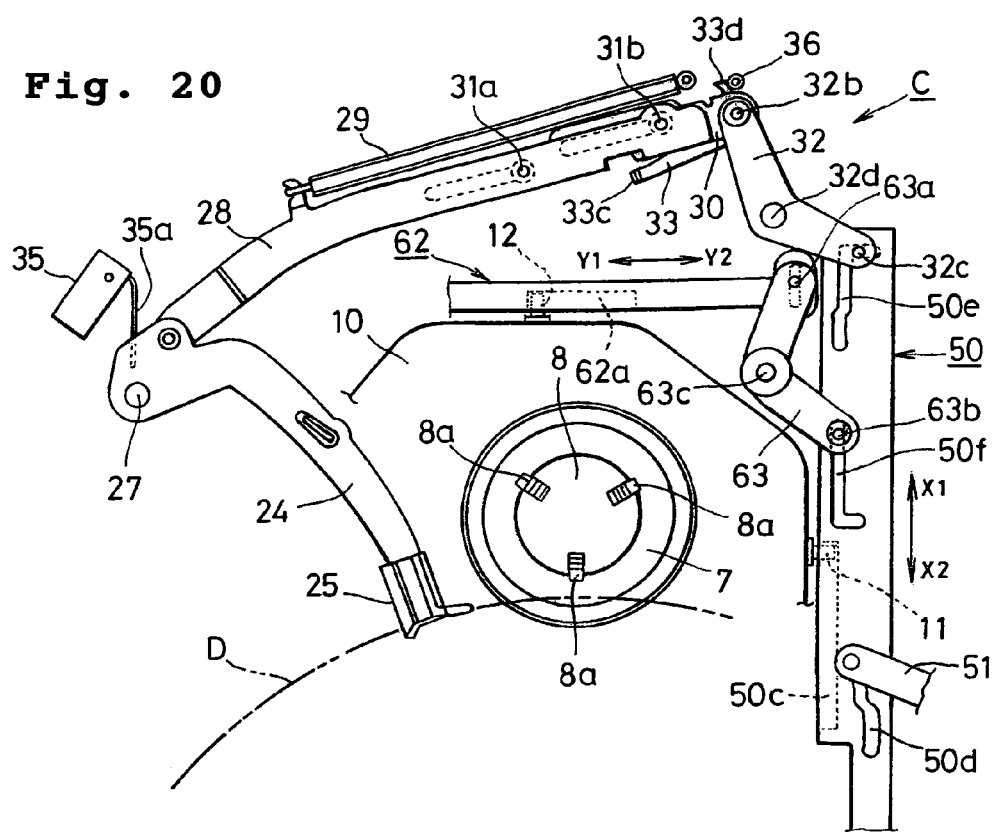
FIG. 20 is a first process diagram illustrating an operation aspect of the disk supporting arm.

Next, an operation aspect of the disk supporting arm 24 will be described. The driving mechanism C for driving the disk supporting arm 24 is constructed by assembling constituent elements shown in FIG. 10, but its operation is performed according to the forward and backward movement of the rack main body 50. That is, in FIG. 20, the driven pin 32c fixed to the end portion of the lever arm 32 is mounted in the guide groove 50e formed in the rack main body 50, and is guided in the guide groove 50e. The state shown in FIG. 20 is the initial state of a state in which the operator inserts the optical disk D into a slot 3a of the front bezel 3 and the front end of the optical disk is accommodated in the end receiving portion 25a of the holder 25 of the front end of the disk supporting arm 24. At this time, since the rear end 33d of the rocking lever 33 is pressed by the driving pin 36, a locking end 33c is not inserted into the notch portions 28c and 30c of the first and second ring arms 28 and 30.

Figure 21:
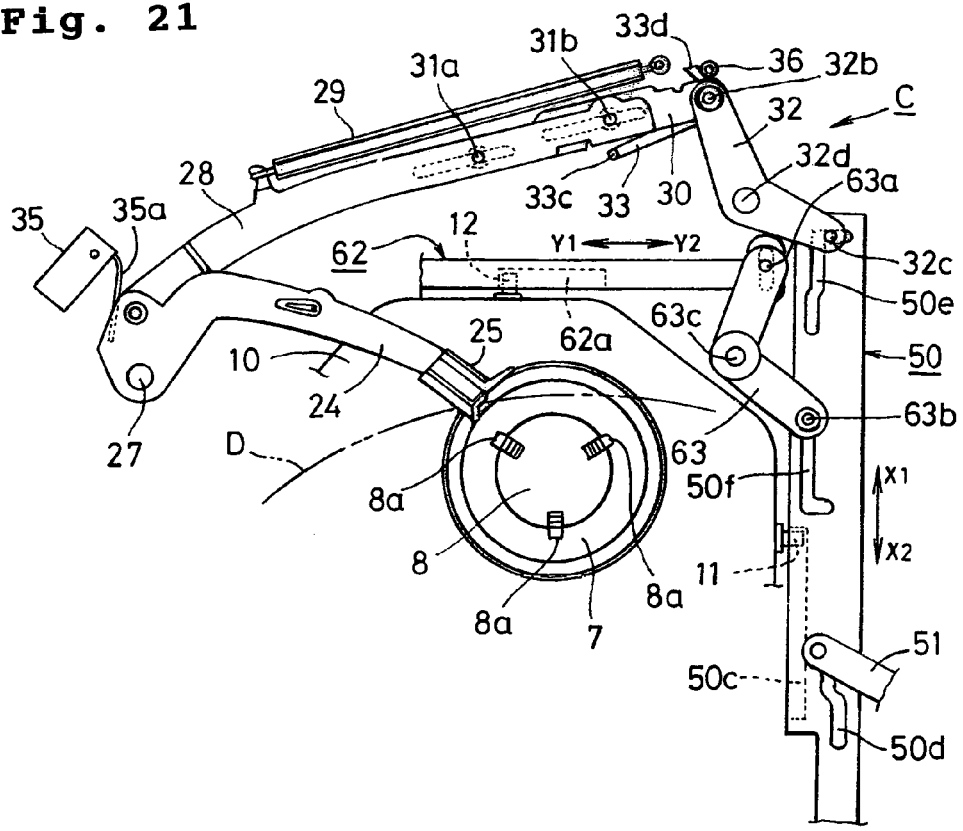
FIG. 21 is a second process diagram illustrating an operation aspect of the disk supporting arm.
Figure 22:
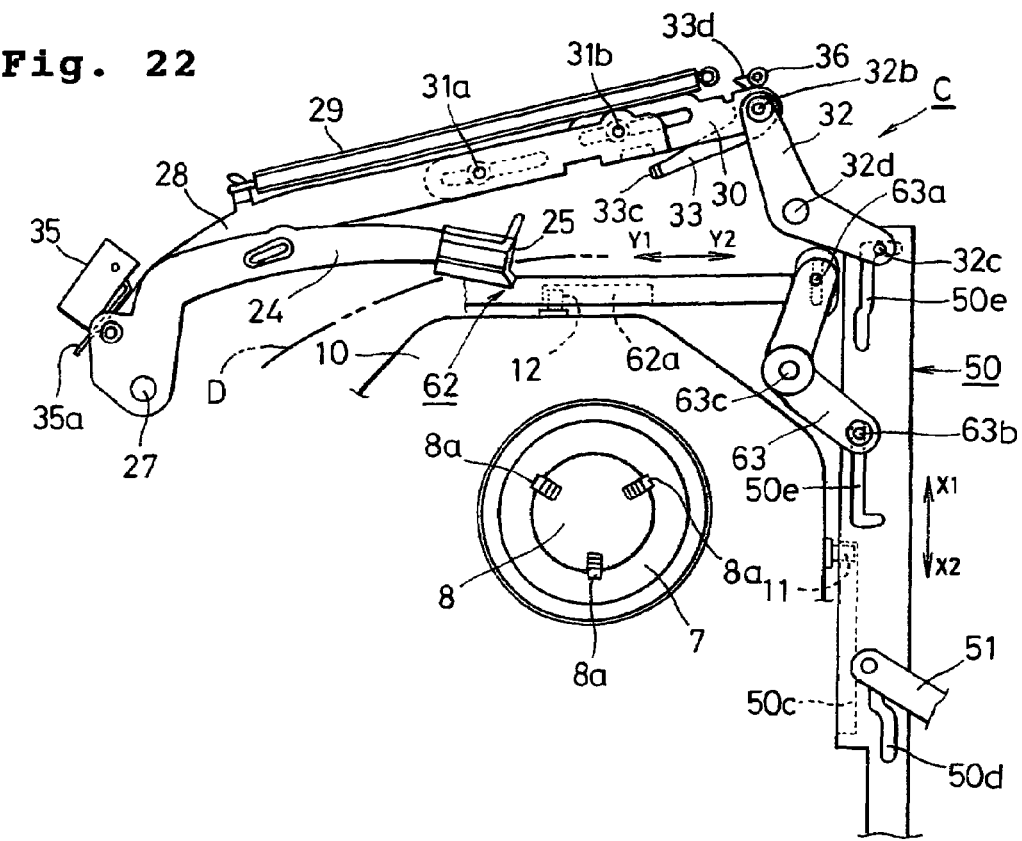
FIG. 22 is a third process diagram illustrating an operation aspect of the disk supporting arm.

FIGS. 21 and 22 show a state in which the operator further inserts the optical disk D in the disk device. The disk supporting arm 24 is rocked backwards, and the first ring arm 28, which is connected to the base end of the disk supporting arm 24 by means of the pivoting pin 24a, is pulled out. At this time, since the lever arm 32 is connected to the rack main body 50 which is being stopped, the second ring arm 30 connected to the lever arm 32 is held at a predetermined location. Accordingly, the first ring arm 28 slides on the second ring arm 30 and enters an extending state. In addition, at a point of time when having reached a state of FIG. 22, the limit switch 35 is operated.

Figure 23:
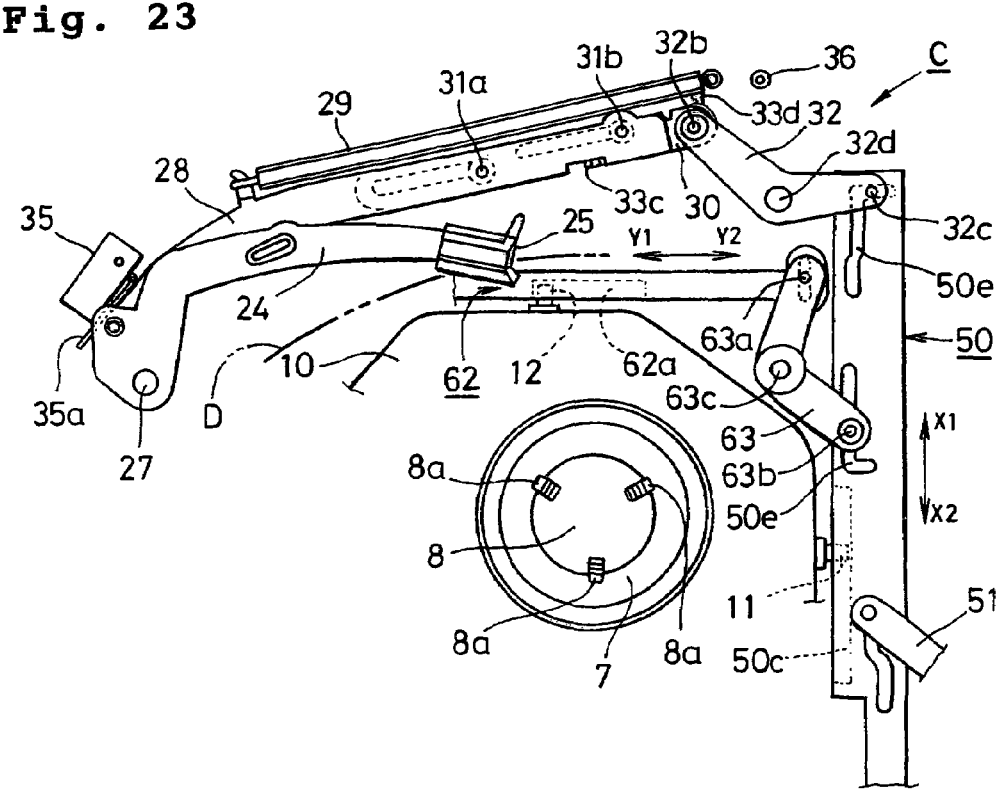
FIG. 23 is a fourth process diagram illustrating an operation aspect of the disk supporting arm.

FIG. 23 shows a state in which the carrying mechanism starts driving on the basis of the signal from the limit switch 35 operated as described above and the rack main body 50 moves backward. The lever arm 32 is rocked by the guide groove 50e of the rack main body 50, and slides and moves forward such that the second ring arm 30 follows the first ring arm 28. Accordingly, the locking end 33c of the rocking lever 33 which is opened by the pressing through the driving pin 36 is inserted between the notch portions 28c and 30c of the first and second ring arms 28 and 30, so that the first and second ring arms 28 and 30 are integrally locked. In addition, in the course reaching from FIGS. 22 to 23, the above-mentioned guiding arm 57 is driven, and the optical disk D is held by the holder 25 of the disk supporting arm 24 and the guiding arm 57.

Figure 24:
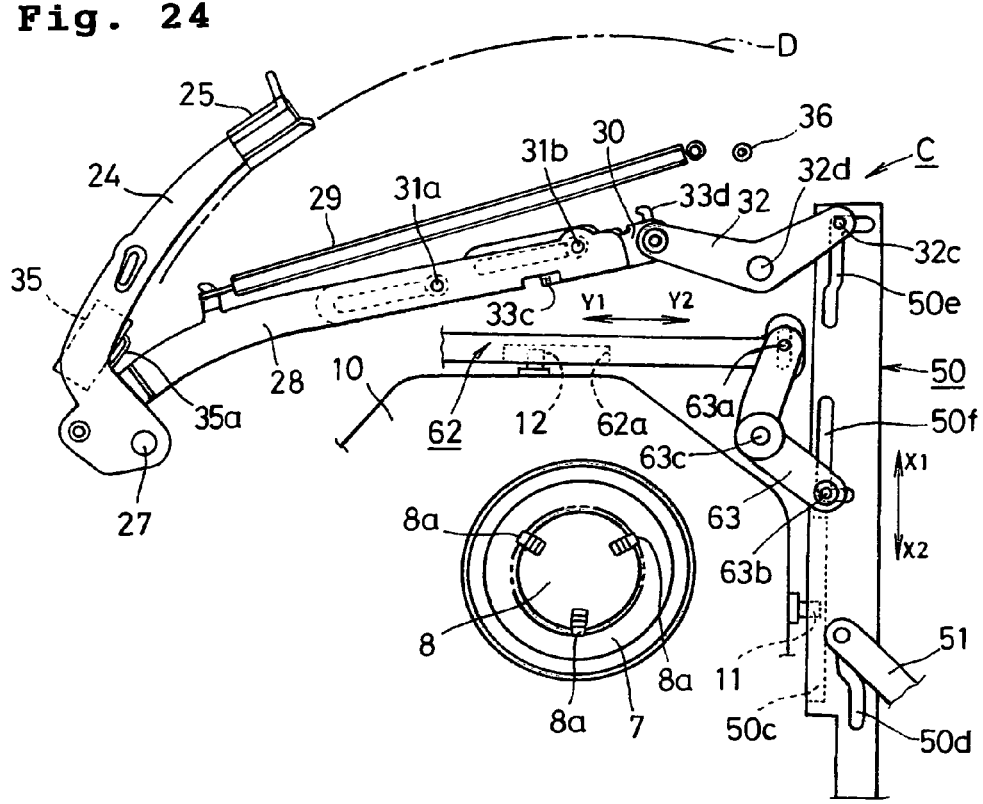
FIG. 24 is a fifth process diagram illustrating an operation aspect of the disk supporting arm.

FIG. 24 shows a state in which the rack main body 50 further moves backward, the disk supporting arm 24 is rocked backward so as to load the optical disk in the disk device, and the central hole Da of the optical disk aligns on the clamp head 8. Up to this point of time, the optical disk D is held by the holder 25 of the disk supporting arm 24 and the guiding arm 57, and the disk supporting arm 24 and the guiding arm 57 are synchronized with each other and are rocked. In addition, in the course reaching from FIGS. 24 to 25, the clamp head 8 ascends, which results in clamping the central hole Da of the optical disk D.

Figure 26:
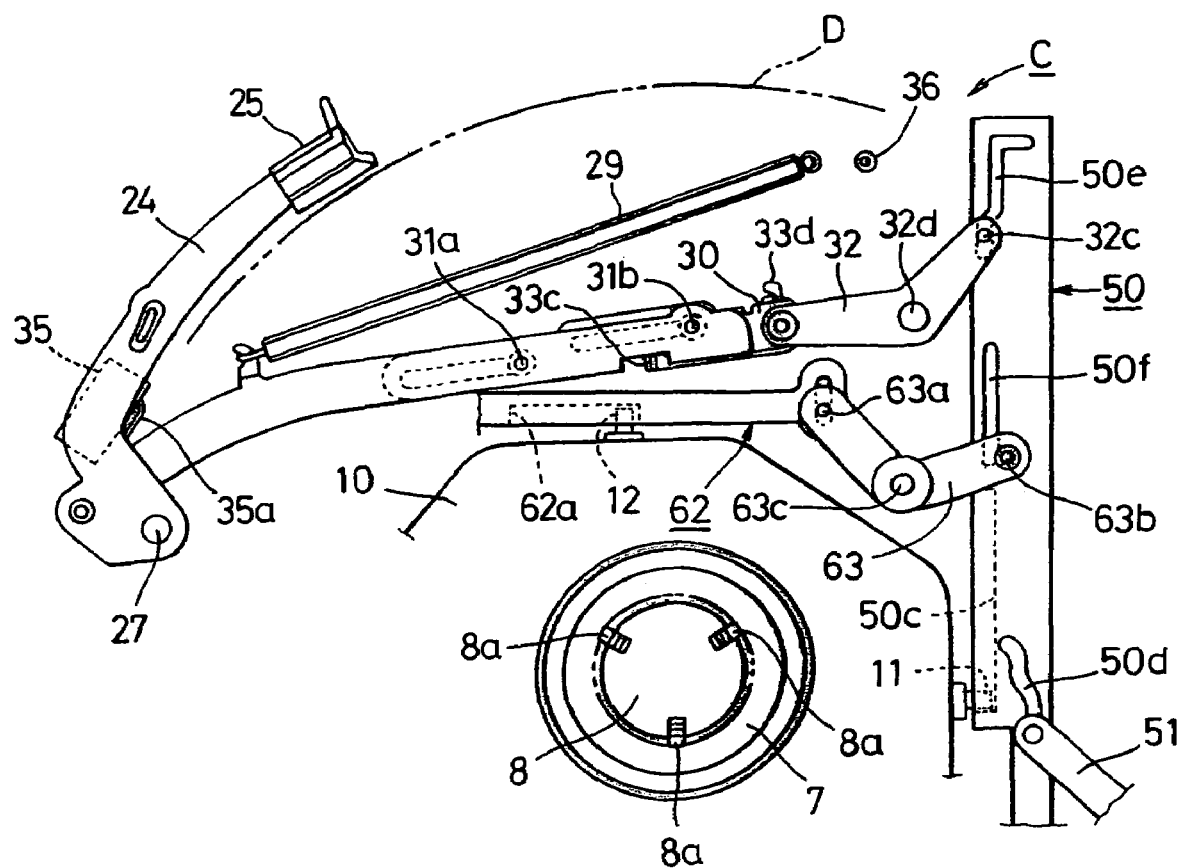
FIG. 26 is a seventh process diagram illustrating an operation aspect of the disk supporting arm.

FIG. 26 shows a state in which the rack main body 50 slightly moves backward after the clamp head 8 clamps the central hole Da of the optical disk D. Thereby, the lever arm 32 is slightly rocked at the terminated portion of the longitudinal groove of the guide groove 50e of the rack main body 50, and the disk supporting arm 24 and the guiding arm 57 are slightly rocked, as shown in FIG. 26. Accordingly, the holding state of the optical disk D is released, and the drive of the optical disk D through the turn table 7 can be achieved.

Figure 27:
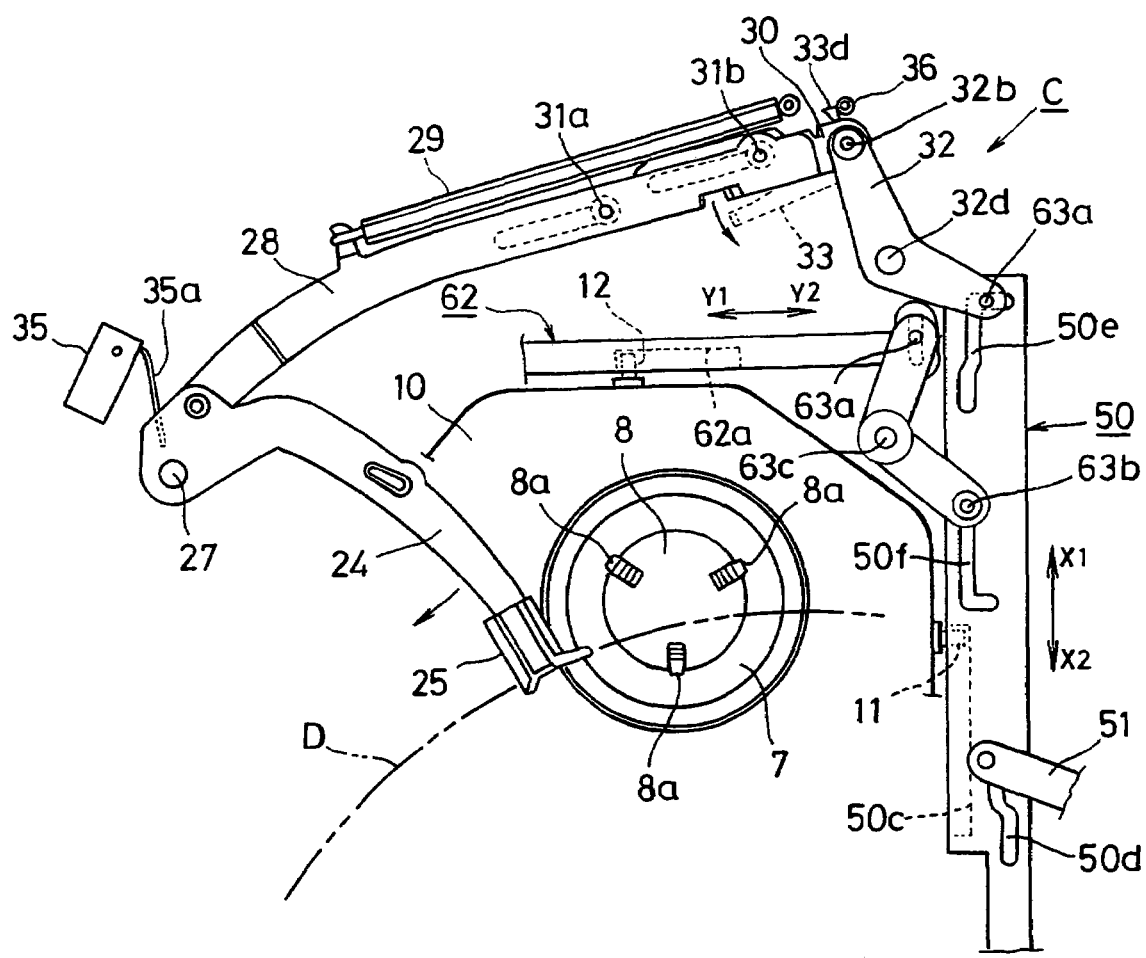
FIG. 27 is a diagram illustrating an operation aspect of the disk supporting arm when carrying an optical disk.

The operation aspect of the driving mechanism C at the time of loading the optical disk D in the disk device has been described, but at the time of unloading the optical disk D from the disk device, mechanism elements of the respective units perform a reversed operation by following a reversed path. That is, the carrying mechanism E is reversely driven, the rack main body 50 moves forward, and the disk supporting arm 24 is rocked forward from the state of FIG. 26 to the state of FIG. 23. In the state shown in FIG. 27, the rear end 33d of the lock lever 33 comes into contact with the driving pin 36. In addition, if the rack main body 50 further moves forwardly, the rear end 33d enters a state in which it is pressed by the driving pin 36. As a result, as shown by a broken line in FIG. 27, the locking end 33c of the rocking lever 33 is rocked and is then separated from the notch portions 28c and 30c of the first and second ring arms 28 and 30, and the locking state is released in which the first and second ring arms 28 and 30 are integrated with each other, and at the same time, the biasing force of the tension coil spring 29 acts, such that the disk supporting arm 24 is rocked to the location shown in FIG. 20. In addition, in the final process at the time of unloading the optical disk from the disk device, the optical disk D is popped out from the slot 3a, so that the unloading process is finished.

As described above, at the time of starting the loading operation of the optical disk D, the first and second ring arms 28 and 30 are in a state in which the locking is released. In addition, as the optical disk D is inserted, the first and second ring arms 28 and 30 are displaced in an expansion direction and are then displaced in a contraction direction, and the lock lever 33 locks them to each other when they enter in a state shown in FIG. 23. On the other hand, at the time of starting the unloading operation of the optical disk D, the first and second ring arms 28 and 30 are in a locking state. Accordingly, in addition, the locking state by the lock lever 33 is released when the first and second ring arms 28 and 30 enter in a state shown in FIG. 27 without being displaced from the expansion direction to the contraction direction, as in the loading operation of the optical disk. As such, at the time of unloading the optical disk D from the disk device, the driving control is performed by the carrying mechanism E without using the biasing force of the tension coil spring 29 in almost all of the unloading processes. The unloading operation is always constant, and thus the state in which the optical disk D is exposed from the slot 3a of the bezel 3 and is stopped, always becomes constant at the time of unloading the optical disk D from the disk device.

Next, the structure of the elevating mechanism for moving the elevating frame 10 in a vertical direction and its operation aspect will be described. In addition, in order to facilitate recognition of the invention, an operation aspect will be described in a case in which the structure containing the spirit of the invention is not embodied in the elevating mechanism.

As can be understood from FIGS. 2 and 9, since the elevating frame 10 of the disk device, that is the subject of the invention, is disposed in a direction along the diagonal line in the device, it is in an inclined state. The rear end of the elevating frame 10 enters in a state in which it is inserted in the corners of the main body. In this case, generally, the rocking supporting point of the elevating frame 10 becomes the axis S-S, and using the axis as the axial center, the front end of the elevating frame 10, that is, the clamp head 8 moves in a vertical direction. In this case, when the distance from the axis S-S to the driven pin 11 is L11 and the distance from the axis S-S to the driven pin 12 is L12, the distances L11 and L12 satisfy the condition of L11<L12. The driven pin 12 should further move in a vertical direction as compared with the driven pin 11. The vertical movement distances of the driven pins 11 and 12 are proportional to the distances from the respective driven pins to the axis S-S. Assuming that the vertical movement distance of the driven pin 11 is H11 and the vertical movement distance of the driven pin 12 is H12, the following relationship is satisfied:

$$H11/L11=H12/L12$$

Figure 28A:
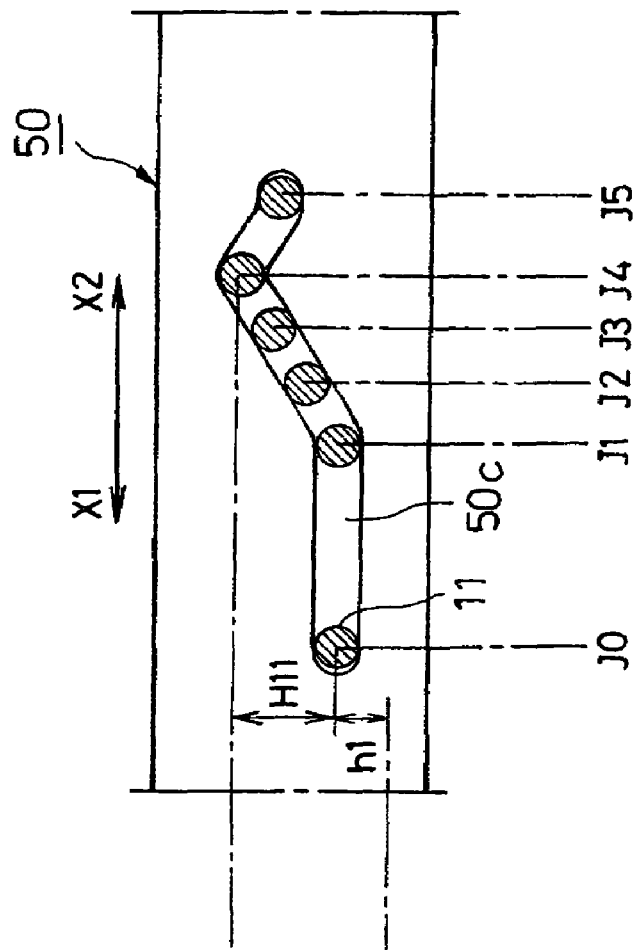
FIGS. 28A and 28B are diagrams illustrating an example of a positional relationship between a cam groove and a driven pin.
Figure 28B:
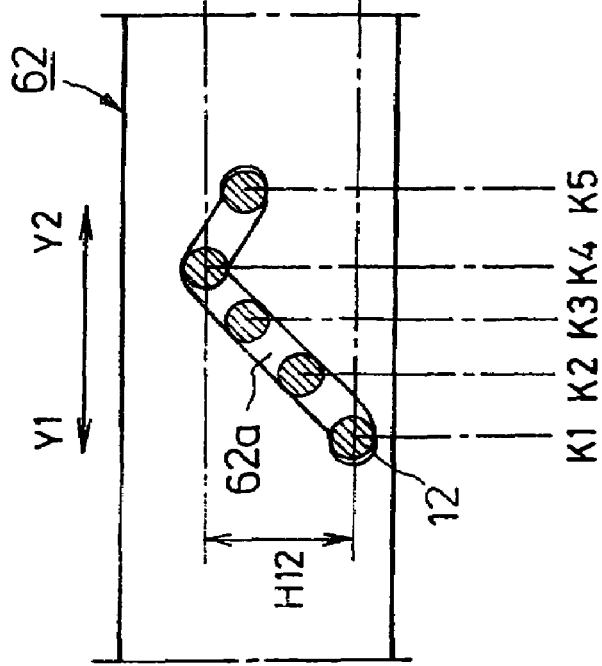

The elevating mechanism of the elevating frame 10 is constructed by the driven pins 11 and 12, the cam groove 50c formed in the rack main body 50, and the cam groove 62a formed in the slide member 62, but since the distances from the driven pins 11 and 12 to the axis S-S are different from each other, the cam grooves 50c and 62a are formed according to the path of the vertical movement of the driven pins 11 and 12. FIGS. 28A and 28B show the shapes of the cam grooves 50c and 62a which are formed so as to correspond to the condition.

FIG. 28A shows the shape of the cam groove 50c formed in the rack main body 50, and FIG. 28B shows the shape of the cam groove 62a formed in the slide member 62. Further, the state of the driven pin 11 in the cam groove 50c varying when the rack main body 50 moves forward and backward in the X1-X2 direction as shown by the positions J0 to J5. Furthermore, the state of the driven pin 12 in the cam groove 62a varying when the slide member 62 moves forward and backward in the Y1-Y2 direction as shown by the positions K1 to K5.

In addition, the end of the slide member 62 is connected to the action pin 63a that is fixed to the end of the ring member 63, and the other end of the ring member 63 is provided with the driven pin 63b. The driven pin 63b is connected to the guide groove 50f of the rack main body 50. In addition, since the supporting point 63c of the ring member 63 is rotatably pivoted, the slide member 62 moves forward and backward in synchronization with the forward and backward movements of the rack main body 50. Accordingly, the cam grooves 50c and 62a are synchronized and move forward and backward, and the driven pin 11 moves in a vertical direction within the range of height H11 of the cam groove 50c. The driven pin 12 moves in a vertical direction within the range of height H12 of the cam groove 62a.

The lower portion of the cam groove 50c within the range of the positions J0 to J1 is in a horizontal state such that it is not in accordance with the initial operation of the rack main body 50, that is, the operation for loading the above-mentioned optical disk D shown in FIGS. 20 to 23, and the stroke of the initial operation is absorbed such that the driven pin 11 does not ascend. The inclined portion for raising the elevating frame 10 and clamping the optical disk D on the clamp head 8 becomes a portion of the cam groove 50c corresponding to the position J1 to the position J4 of the top portion of the cam groove, and a portion of the cam groove 50c corresponding to the positions J4 to J5 has a large height such that the optical disk D can be driven.

On the other hand, since the slide member 62 is synchronized within the range of the position J1 of the cam groove 50c of the rack main body 50 to the position J5 and moves forward and backward, it becomes the inclined portion immediately from the position K1 of the lower portion and reaches the position K4 of the top portion of the cam groove. The portion corresponding to the range of the positions K4 to K5 has the same shape as the portion corresponding to the range of positions J4 to J5 in the cam groove 50c.

The relationship between the height H11 from the lower portions of the cam groove 50c corresponding to the positions J0 to J1 to the top portion J4 and the height H12 from the position K1 of the cam groove 62a to the top portion K4 satisfies the condition of H11<H12. As shown in the same drawings, the relative height difference h1 is generated such that the positions J0 to J1 are higher than the position K1. In addition, since the width of the inclined portion formed from the positions J1 to J4 of the cam groove 50c is equal to the width of the inclined portion formed from the positions K1 to K4 of the cam portion 62a, the inclined portion of the cam groove 50c having the smaller height difference has smaller inclination than the inclined portion of the cam groove 62a having the larger height difference. Accordingly, the driven pin 12 ascends and descends more than the driven pin 11 with the same amount of movement of the rack main body 50 and the slide member 62, and the driven pins 11 and 12 have the same height within a range of the positions J4 to J5 and a range of the positions K4 to K5.

Figure 29A:
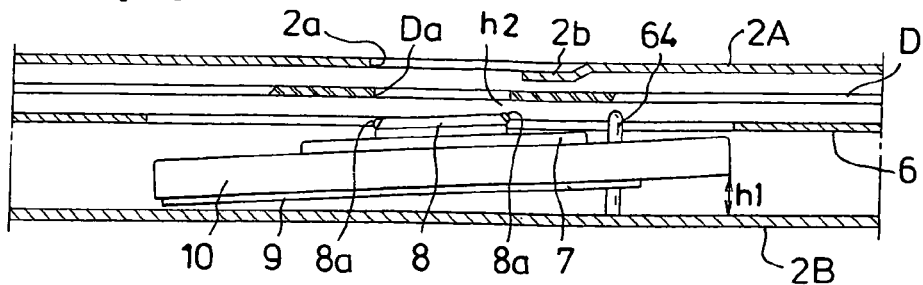
FIGS. 29A to 29E are diagrams illustrating an example of an operation aspect when an elevating frame goes up.

Next, an operation aspect of the elevating frame 10 in the axis R-R shown in FIG. 9 will now be described with reference to FIGS. 29A to 29E and FIGS. 30A to 30E. FIGS. 29A to 29E show the process that the elevating frame 10 ascends. FIG. 29A shows a state in which the elevating frame 10 descends to the maximum range, and shows a state right after the optical disk D is inserted in the slot 3a of the front bezel 3, that is, a state shown in FIG. 20. At this time, the driven pin 11 exists at the position J0 of the cam groove 50c and the driven pin 12 exists at the position K1 of the cam groove 62a. Accordingly, since the height difference h1 exists between the driven pins 11 and 12, the elevating frame 10 enters in an inclined state as shown in FIG. 29A.

Figure 29B:
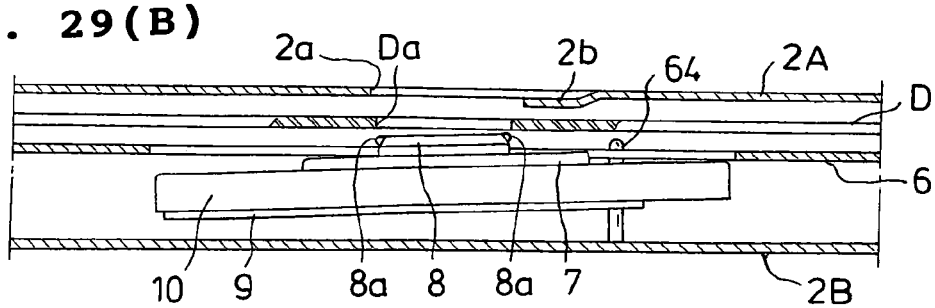

If the loading of the optical disk D progresses from the state shown in FIG. 29A, the state is shifted to a state in which the stroke of the initial operation of the rack main body 50 is absorbed, that is, the rack main body 50 moves in an X1 direction, and the driven pin 11 moves from the position J0 of the cam groove 50c to the position J1, as shown in FIG. 23. In addition, if the rack main body 50 further moves in the X1 direction, the driven pin 11 moves to the position J2 of the cam groove 50c as shown in FIG. 24. If the driven pin 12 reaches the position K2 of the cam groove 62a, the elevating frame 10 slightly ascends from the initial position as shown in FIG. 29B. At this time, since the driven pin 12 has a larger ascending width than the driven pin 11, the elevating frame gradually enters in a horizontal state.

Figure 29C:
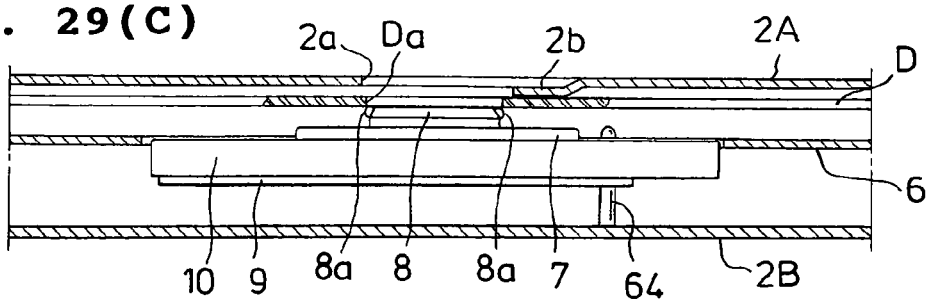

In addition, if the rack main body 50 further moves in the X1 direction and the slide member 62 further moves in the Y1 direction, the driven pin 11 of the cam groove 50c reaches the position J3 and at the same time, the driven pin 12 of the cam groove 62a reaches the position K3. In this process, the chuck pawl 8a of the clamp head 8 comes into contact with the central hole Da of the optical disk D. In this state, the optical disk D is pushed up, and the periphery of the central hole Da of the optical disk D comes into contact with the convex portion 2b of the opening 2a of the cover chassis 2A, as shown in FIG. 29C.

Figure 25:
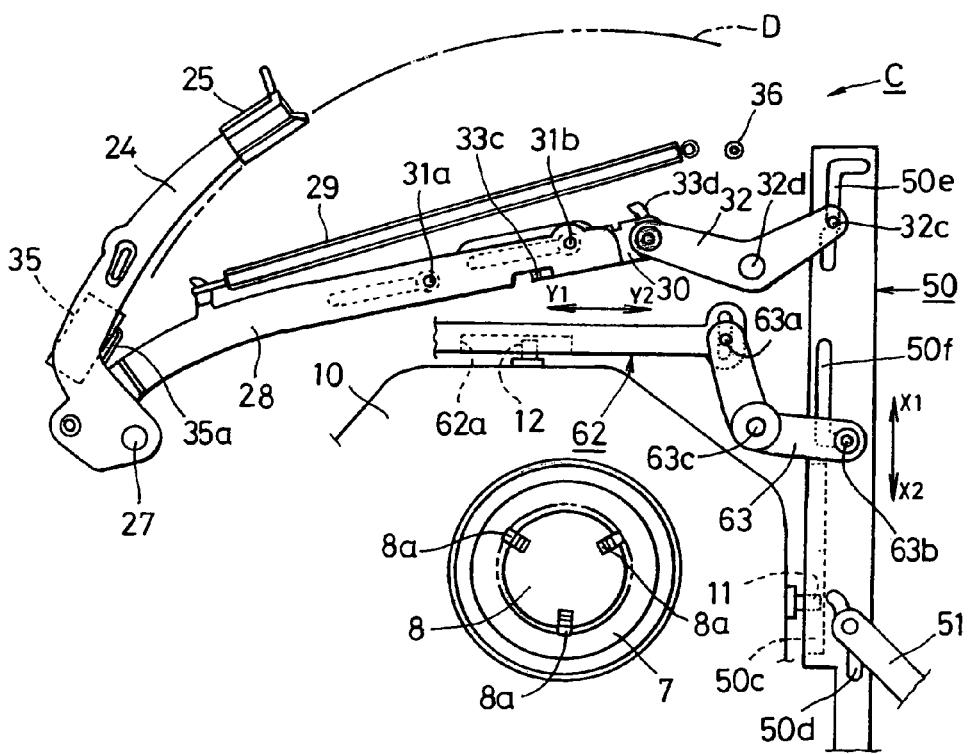
FIG. 25 is a sixth process diagram illustrating an operation aspect of the disk supporting arm.
Figure 29D:
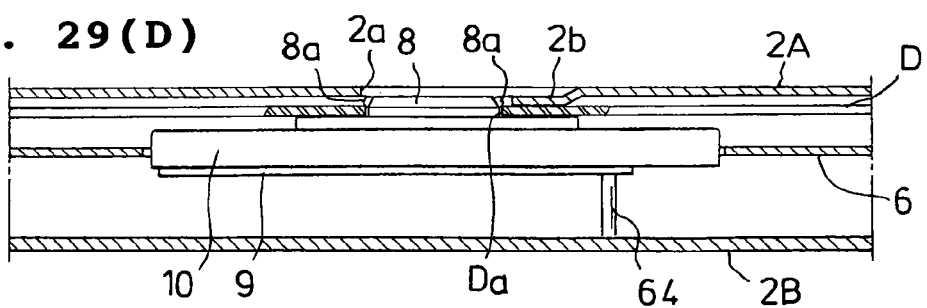

FIG. 29D shows a state in which the driven pin 11 of the cam groove 50c reaches the position J4 and at the same time, the driven pin 12 of the cam groove 62a reaches the position K4. In this case, the clamp head 8 enters in the central hole Da of the optical disk D to clamp it and the optical disk D is held on the turn table 7 as shown in FIG. 25. If it enters this state, the heights of the driven pins 11 and 12 are the same, and the elevating frame 10 enters in the horizontal state.

Figure 29E:
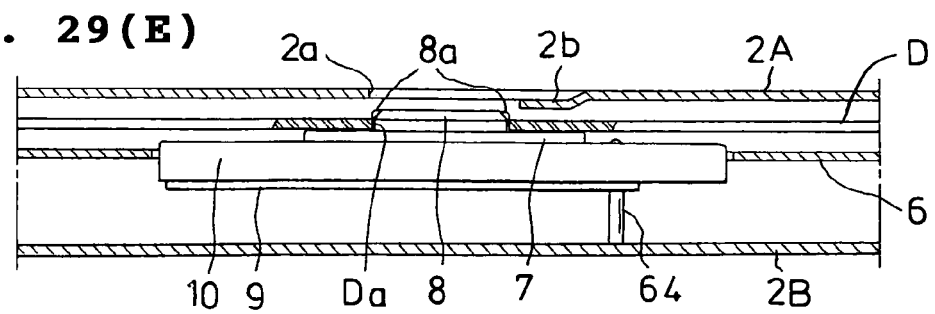

FIG. 29E shows a state in which the driven pin 11 of the cam groove 50c reaches the position J5 and at the same time, the driven pin 12 of the cam groove 62a reaches the position K5. In this case, the elevating frame 10 slightly descends and the optical disk D can be driven as shown in FIG. 26.

Figure 30A:
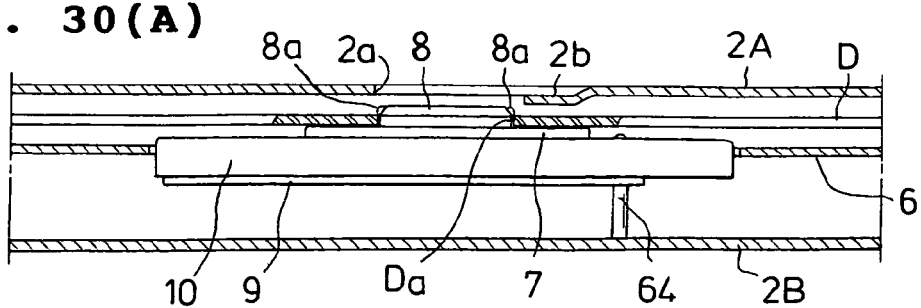
FIGS. 30A to 30E are diagrams illustrating an example of an operation aspect when the elevating frame goes down.

Next, in order to load the optical disk D from the state in which the optical disk D can be driven, the process that the elevating frame 10 descends will be described with reference to FIGS. 30A to 30E. FIG. 30A shows a state in which the optical disk D can be driven in the same manner as FIG. 29E. In this state, if the unloading of the optical disk D is instructed, the reverse operation of the carrying mechanism starts, and the rack main body 50 moves in the X2 direction and the slide member 62 moves in the Y2 direction.

Figure 30B:
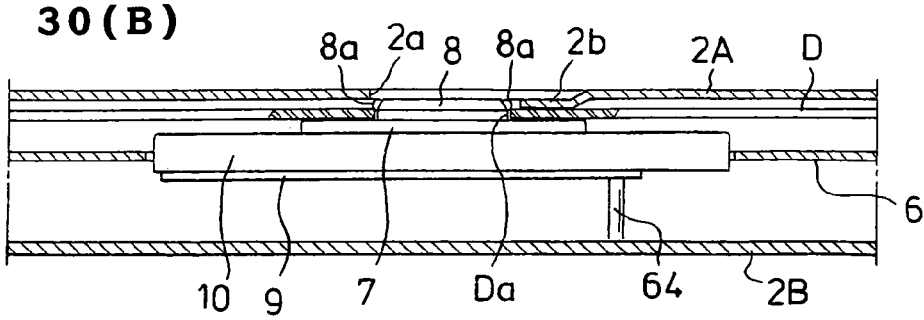

FIG. 30B shows a state in which the driven pin 11 of the cam groove 50c moves from the position J5 to the position J4 and at the same time, the driven pin 12 of the cam groove 62a moves from the position K5 to the position K4. In this case, the elevating frame 10 is temporarily raised.

Figure 30C:
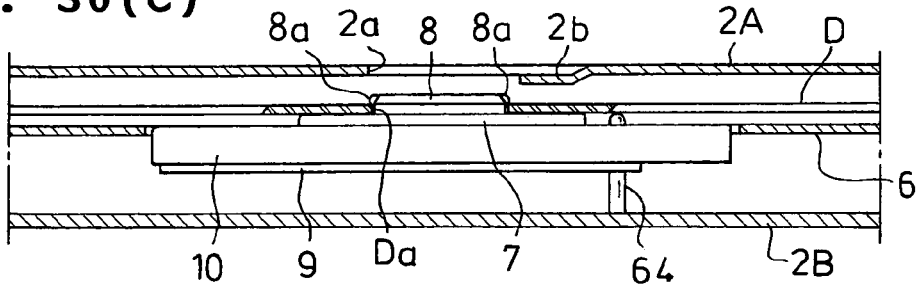

FIG. 30C shows a process in which the driven pin 11 of the cam groove 50c moves from the position J4 to the position J2 via the position J3 and at the same time, the driven pin 12 of the cam groove 62a moves from the position K4 to the position K2 via the position K3. In a process in which the elevating frame 10 descends, the optical disk D clamped by the clamp head 8 is pushed up by the release pin 64, so that clamping of the optical disk D is released.

Figure 30D:
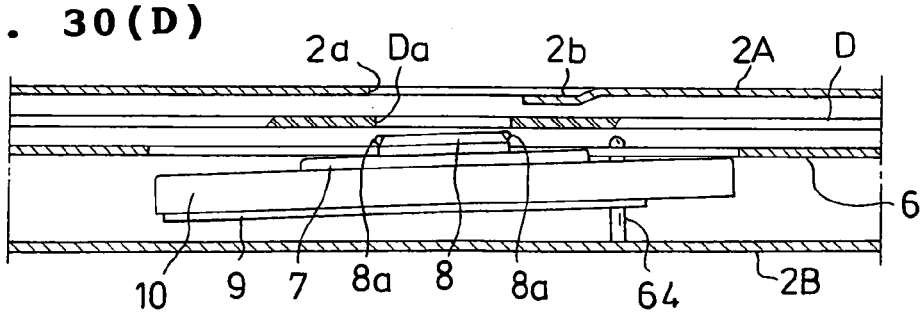

FIG. 30D shows a state in which the driven pin 11 of the cam groove 50c reaches the position J2 and at the same time, the driven pin 12 of the cam groove 62a reaches the position K2. In this case, since the driven pin 12 descends more than the driven pin 11, the elevating frame 10 is gradually inclined.

Figure 30E:
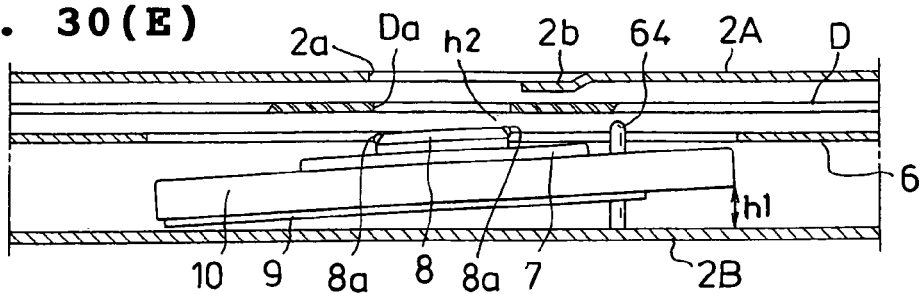

FIG. 30E shows a state in which the driven pin 11 of the cam groove 50c reaches the position J1 and at the same time, the driven pin 12 of the cam groove 62a reaches the position K1. In this case, since the maximum inclination is made due to the relative height difference h1 of the driven pins 11 and 12 and the descending of the elevating frame 10 is finished, the gap h2 is formed between the clamp head 8 and the optical disk D and the optical disk D can be unloaded. In addition, in the inclined state, a portion of the rear surface of the elevating frame 10 closest to the bottom chassis 2B becomes a side end U of the guide shaft 16 (see FIGS. 4 and 5).

Figure 31:
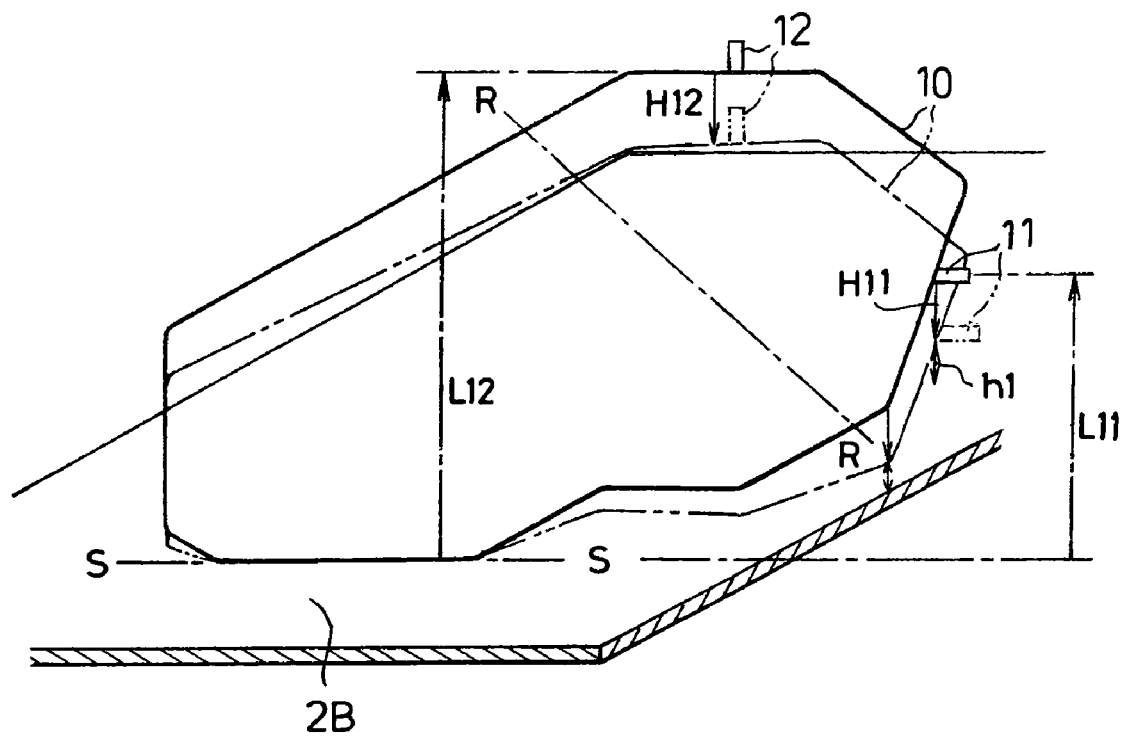
FIG. 31 is a schematic diagram illustrating an example of the operation aspects of FIGS. 29 and 30.

FIG. 31 schematically shows an operation aspect of the above-mentioned elevating frame 10. In this case, since the elevating frame 10 is rocked using the axis S-S as the axial center, the side of the elevating frame 10 supported to the driven pin 12 located at the distance L12 from the axis S-S descends to the position of a virtual line corresponding to a height H12 determined by the cam groove 62a. On the other hand, the side of the elevating frame 10 supported to the driven pin 11 located at the distance L11 from the axis S-S descends to the position of a virtual line corresponding to a height H11, but it is floated by the height difference h1 between lower portions of the cam grooves 50c and 62a. This is made in order that the side supported to the driven pin 12 descends by the distance corresponding to the height H12, the elevating frame 10 is inclined, and the gap h2 between the top portion of the clamp head 8 and the optical disk D is ensured. However, the thickness reduction cannot be made by the width corresponding to the height difference h1.

Accordingly, in the invention, an example of the structure will now be described in which the vertical movement of the elevating frame 10 is controlled in the mechanical manner such that an unnecessary gap is not generated between the bottom chassis 2B and the bottom surface of the elevating frame 10 while ensuring the gap h2 between the top portion of the clamp head 8 and the optical disk D, and deviation is not generated in the gap between the bottom chassis 2B and the bottom surface of the elevating frame 10.

FIG. 32A shows a shape of the cam groove 50c formed in the rack main body 50 and FIG. 32B shows a shape of the cam groove 62a formed in the slide member 62. Also in this structure, the state of the driven pin 11 in the cam groove 50c varying when the rack main body 50 moves forward and backward in an X1-X2 direction is shown by the positions J0 to J5, and the state of the driven pin 12 in the cam groove 62a varying when the slide member 62 moves forward and backward in a Y1-Y2 direction is shown by the positions K1 to K5.

The end of the slide member 62 is connected to the action pin 63a fixed to the end portion of the ring member 63, the other end of the ring member 63 is provided with the driven pin 63b, and the driven pin 63b is connected to the guide groove 50f of the rack main body 50. In addition, since the supporting point 63c of the ring member 63 is rotatably pivoted, the slide member 62 moves forward and backward in synchronization with the forward and backward movement of the rack main body 50. Accordingly, the cam grooves 50c and 62a are also synchronized and move forward and backward, the driven pin 11 moves in the vertical direction within the range of the height H12 of the cam groove 50c, and the driven pin 12 moves in the vertical direction within the range of the height H12 of the cam groove 62a. In addition, since the heights H11 and H12 of the cam grooves 50c and 62a are determined such that the gap between the elevating frame and the bottom chassis decreases according to the shapes of the elevating frame and the bottom chassis, they are not necessarily equal to each other.

The lower portion of the cam groove 50c within the range of the positions J0 to J1 of the cam groove 50c is formed in a horizontal state such that it is not in accordance with the initial operation of the rack main body 50, that is, the operation for loading the above-mentioned optical disk D shown in FIGS. 20 to 23. The driven pin 11 does not ascend, so that the stroke of the initial operation is absorbed. The portion of the cam groove 50c corresponding to a range of the position J1 to the position J4 of the top portion of the cam groove becomes the inclined portion for raising the elevating frame 10 and clamping the optical disk D on the clamp head 8, and a portion of the cam groove 50c corresponding to a range of the positions J4 to J5 of the cam groove 50c becomes an upper portion such that the optical disk D can be driven.

On the other hand, since the slide member 62 is synchronized within a range of the position J1 of the cam groove 50c of the rack main body to the position J5 and moves forward and backward, it becomes the inclined portion immediately from the position K1 of the lower portion and reaches the position K4 of the top portion of the cam groove. The portion of the cam groove 62a corresponding to the range of the positions K4 to K5 has the same shape as the portion corresponding to the range of the positions J4 to J5 of the cam groove 50c. In addition, in the present embodiment, the height H12 from the lower portion of the camp groove 50c located at the positions J0 to J1 to the top portion J4 is equal to the height H11 from the position K1 of the cam groove 62a to the top portion.

Figure 33A:
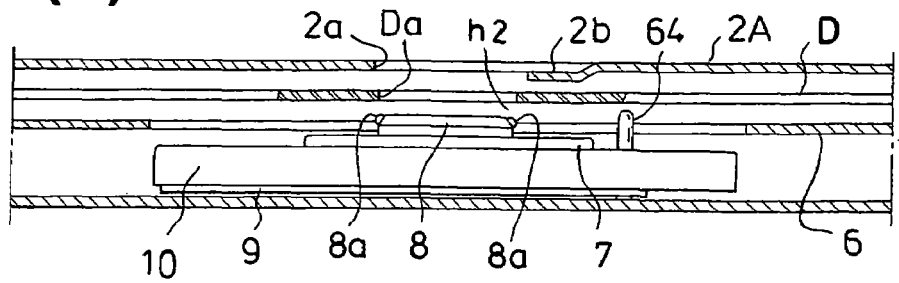
FIGS. 33A to 33E are diagrams illustrating an operation aspect when the elevating frame goes up.

Next, an operation of the elevating frame 10 in the axis R-R shown in FIG. 9 will now be described with reference to FIGS. 33A to 33E and 34A to 34E. FIG. 33A to 33E show the process where the elevating frame 10 ascends. FIG. 33A shows a state in which the elevating frame 10 descends to the maximum range, and shows a state right after the optical disk D is inserted in the slot 3a of the front bezel 3, that is, a state shown in FIG. 20. At this time, the driven pin 11 exists at the position J0 of the cam groove 50c and the driven pin 12 exists at the position K1 of the cam groove 62a. Accordingly, the bottom surface of the elevating frame 10 in the axis R-R is closest to the bottom chassis 2B.

Figure 33B:
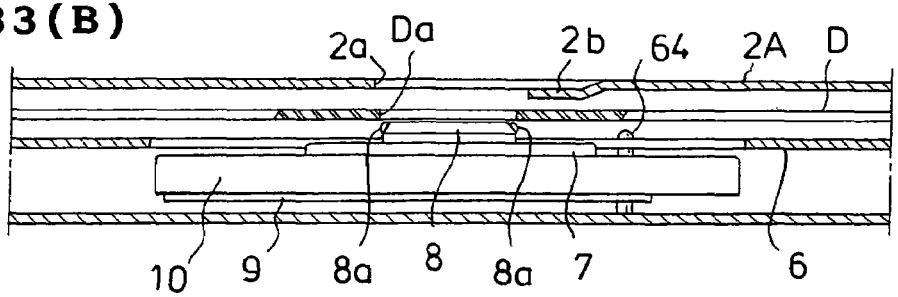

If the loading operation of the optical disk D progresses from the state shown in FIG. 33A, the state is shifted to a state in which the stroke of the initial operation of the rack main body 50 is absorbed, that is, the rack main body 50 moves in the X1 direction and the driven pin 11 of the cam groove 50c moves from the position J0 of the cam groove 50c to the position J1, as shown in FIG. 23. In addition, if the rack main body 50 further moves in the X1 direction, the driven pin 11 of the cam groove 50c moves to the position J2 as shown in FIG. 24. If the driven pin 12 of the cam groove 62a reaches the position K2, the elevating frame 10 is slightly raised from the initial state as shown in FIG. 33B.

Figure 33C:
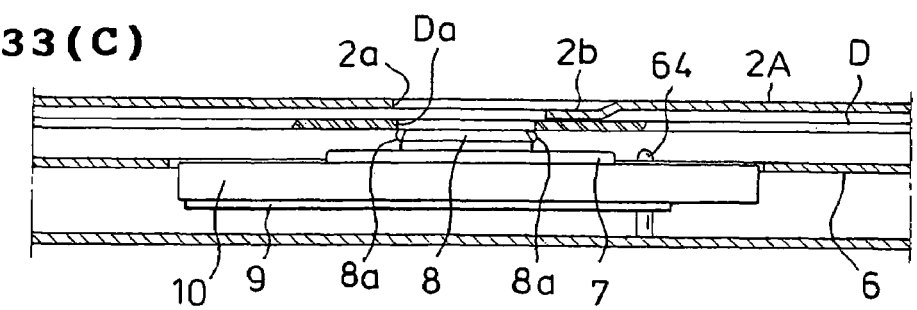

In addition, if the rack main body 50 further moves in the X1 direction and the slide member 62 further moves in the Y1 direction, the driven pin 11 of the cam groove 50c reaches the position J3 and at the same time, the driven pin 12 of the cam groove 62a reaches the position K3. In this process, the chuck pawl 8a of the clamp head 8 comes into contact with the central hole Da of the optical disk D. In this state, if the optical disk D is pushed up, the periphery of the central hole Da of the optical disk D comes into contact with the convex portion 2b of the opening 2a of the cover chassis 2A, as shown in FIG. 33C.

Figure 33D:
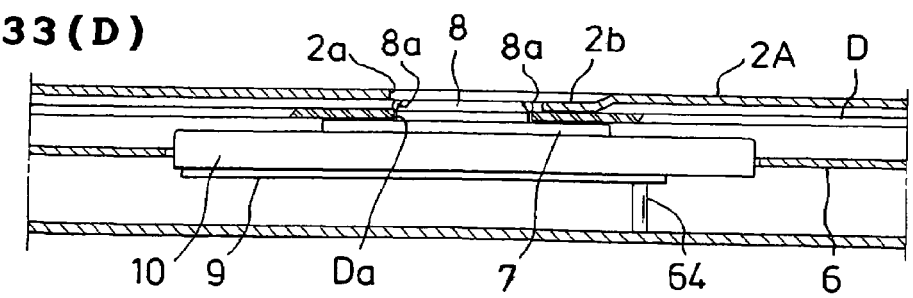

From the above-mentioned state, if the driven pin 11 of the cam groove 50c reaches the position J4 and at the same time, the driven pin 12 of the cam groove 62a reaches the position K4, as shown in FIG. 33D, the clamp head 8 enters in the central hole Da of the optical disk D and the periphery of the central hole Da is clamped by the chuck pawl 8a and the optical disk D is held on the turn table.

Figure 33E:
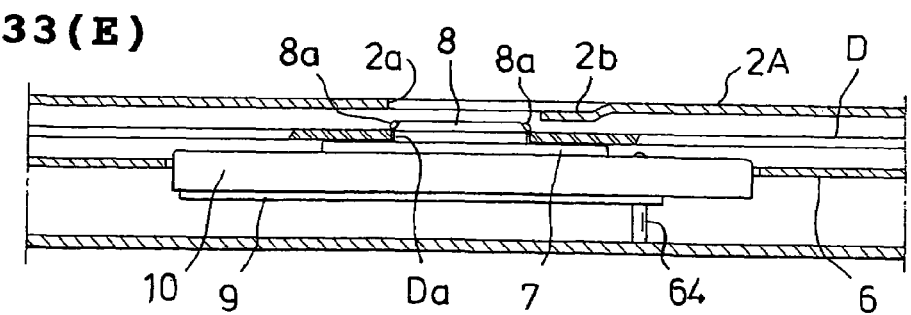

If the driven pin 11 of the cam groove 50c moves from the position J4 to the position J5 and at the same time, the driven pin 12 of the cam groove 62a moves from the position K4 to the position K5, the elevating frame 10 slightly descends and enters in a state shown in FIG. 33E. In addition, the state becomes a state shown in FIG. 26 such that the optical disk D can be driven.

Figure 34A:
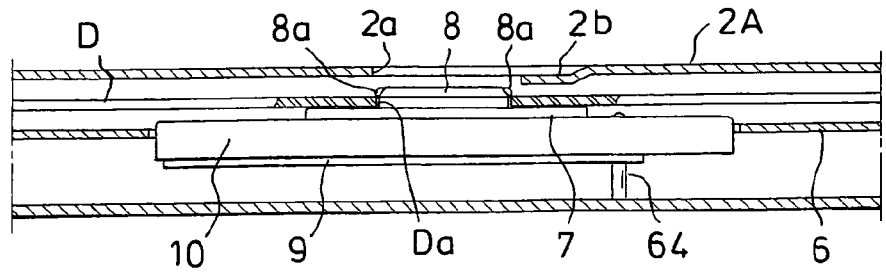
FIGS. 34A to 34E are diagrams illustrating an operation aspect when the elevating frame goes down.

Next, in order to load the optical disk D from the state in which the optical disk D can be driven, the process when the elevating frame 10 descends will be described with reference to FIGS. 34A to 34E. FIG. 34A shows a state in which the optical disk D can be driven in the same manner as FIG. 33E. In this state, if the unloading of the optical disk D is instructed, the reverse operation of the carrying mechanism starts, and the rack main body 50 moves in the X2 direction and the slide member 62 moves in the Y2 direction.

Figure 34B:
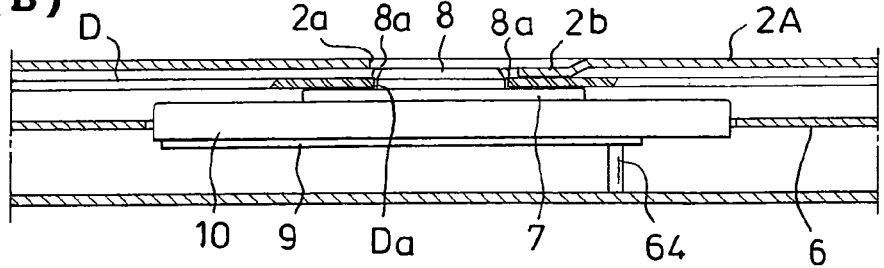

FIG. 34B shows a state in which the driven pin 11 of the cam groove 50c moves from the position J5 to the position J4 and at the same time, the driven pin 12 of the cam groove 62a moves from the position K5 to the position K4. In this case, the elevating frame 10 is temporarily raised at the inclined portion.

Figure 34C:
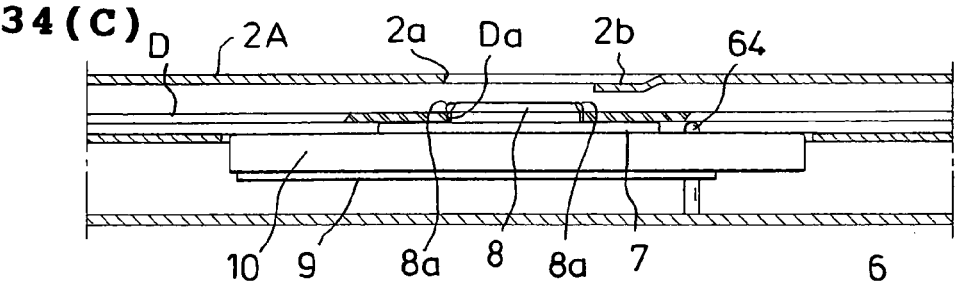

FIG. 34C shows a process in which the driven pin 11 of the cam groove 50c moves from the position J4 to the position J2 via the position J3 and at the same time, the driven pin 12 of the cam groove 62a moves from the position K4 to the position K2 via the position K3. During the process in which the elevating frame 10 descends, the optical disk D clamped by the clamp head 8 is pushed up by the release pin 64, so that clamping of the optical disk D is released.

Figure 34D:
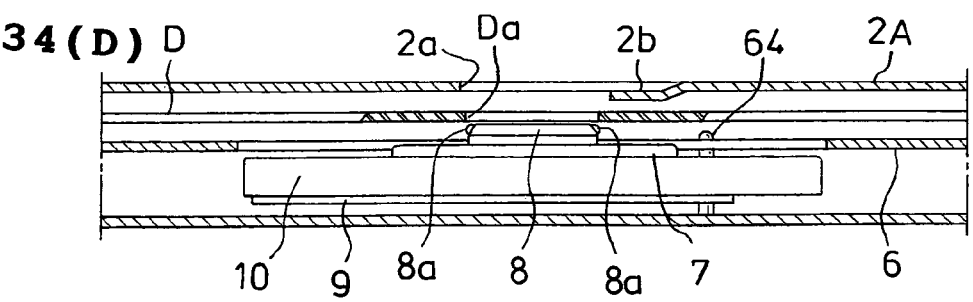
Figure 34E:
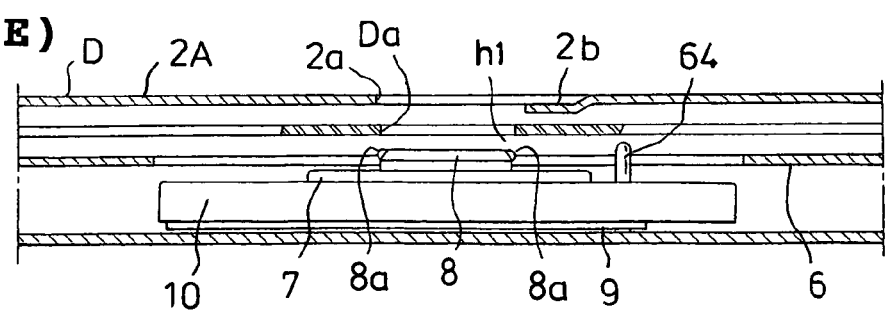

FIG. 34D shows a state in which the driven pin 11 of the cam groove 50c reaches the position J2 and at the same time, the driven pin 12 of the cam groove 62a reaches the position K2. In this case, if the driven pins 11 and 12 are synchronized, both descend and reach the positions J1 and K1, respectively, the elevating frame 10 is stopped in the most descending state, as shown in FIG. 34E.

Figure 35:
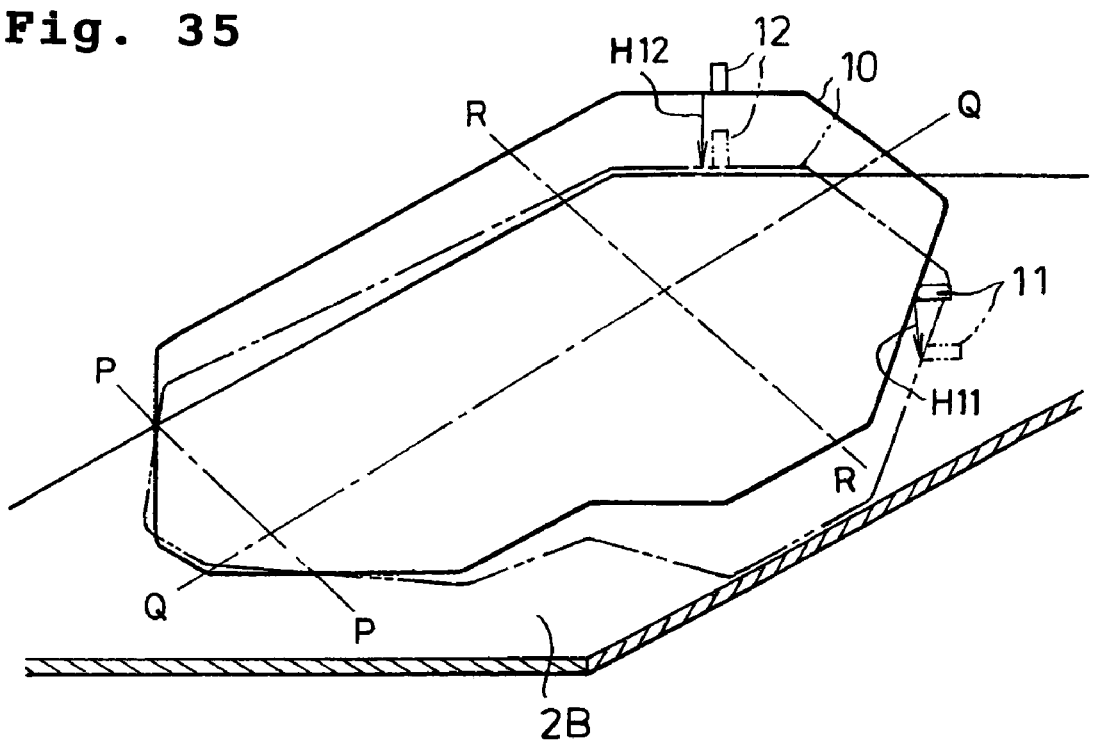
FIG. 35 is a diagram illustrating the operation aspects of FIGS. 33 and 34.

As shown schematically in FIG. 35, according to the operation aspect of the elevating frame 10, in the descending of the elevating frame 10 from the solid line to the virtual line, the horizontal state of the plane orthogonal to the diagonal line Q-Q of the elevating frame 10 is held and not shifted to the inclined state. Accordingly, deviation is not generated in the gap between the bottom surface of the elevating frame 10 of the axis R-R and the bottom chassis 2B.

In addition, according to the present embodiment, assuming that a vertical movement distance of the driven pin 11 is H11, a vertical movement distance of the driven pin 12 is H12, the distance from the driven pin 11 to the axis S-S is L11, and the distance from the driven pin 12 to the axis S-S is L12, the following relationship is satisfied:

$$H11/L11 > H12/L12$$

When the elevating frame descends, if comparing the driven pin 11 side (right side) and the driven pin 12 side (left side) of the elevating frame 10 with each other, the driven pin 11 side (right side) of the elevating frame 10 is more inclined than the driven pin 12 side (left side).

As such, when the elevating frame 10 descends, of supporting tongue pieces 10a and 10b which support the axis S-S side of the elevating frame, the supporting tongue piece 10a located at the left side slightly floats and the supporting tongue piece 10b located at the right side is slightly sunk. As a result, when the elevating frame 10 descends, the axial center of the rocking becomes the axis P-P (see FIG. 9). In addition, the displacement of the vertical direction of the supporting tongue pieces 10a and 10b is performed when the buffering member 23 is deformed.

Figure 36:
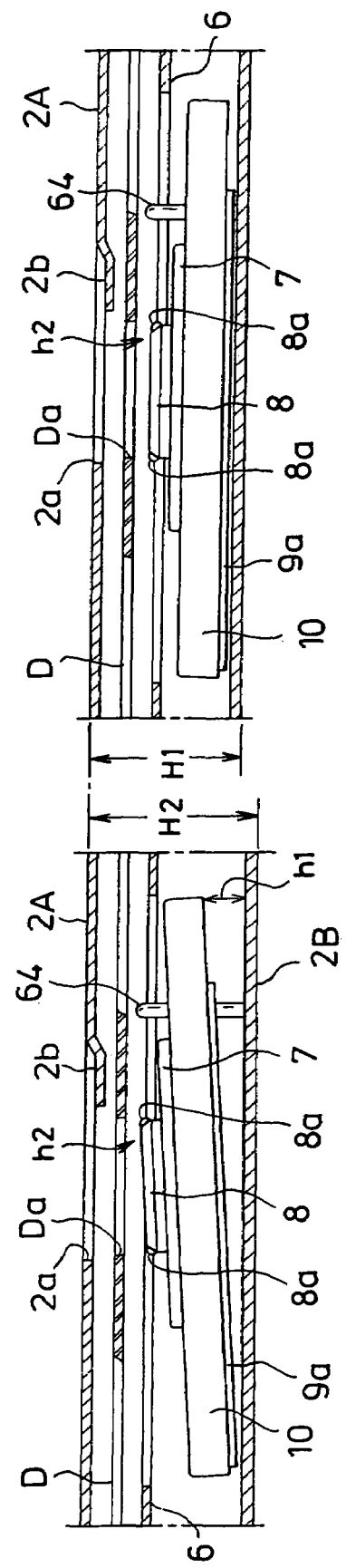
FIGS. 36A and 36B are schematic diagrams illustrating a thickness state when a manufacture of the disk device of the invention is finished.
Figure 37:
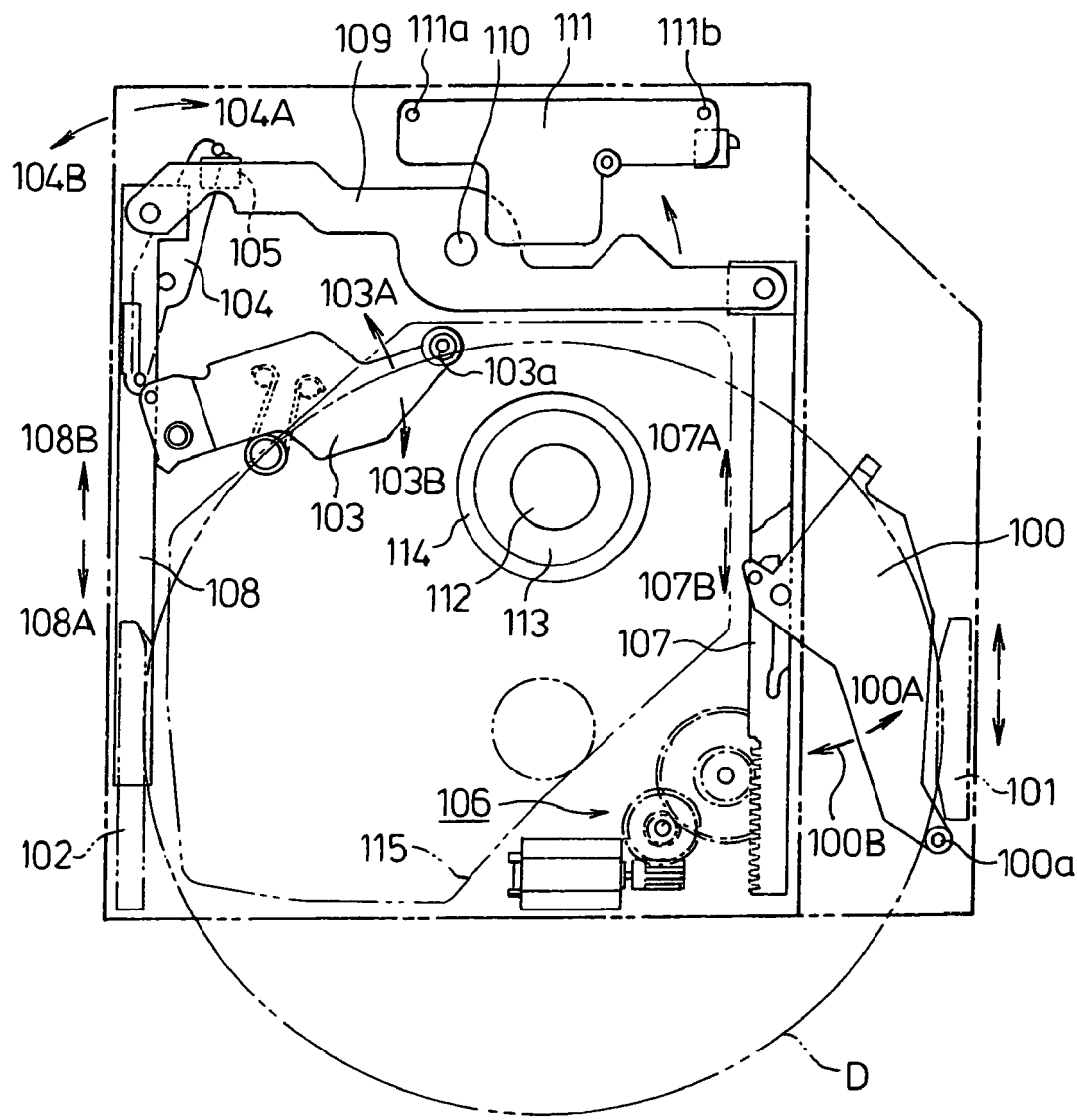
FIG. 37 is a first process diagram illustrating an operation aspect of a disk device according to a related art.
Figure 38:
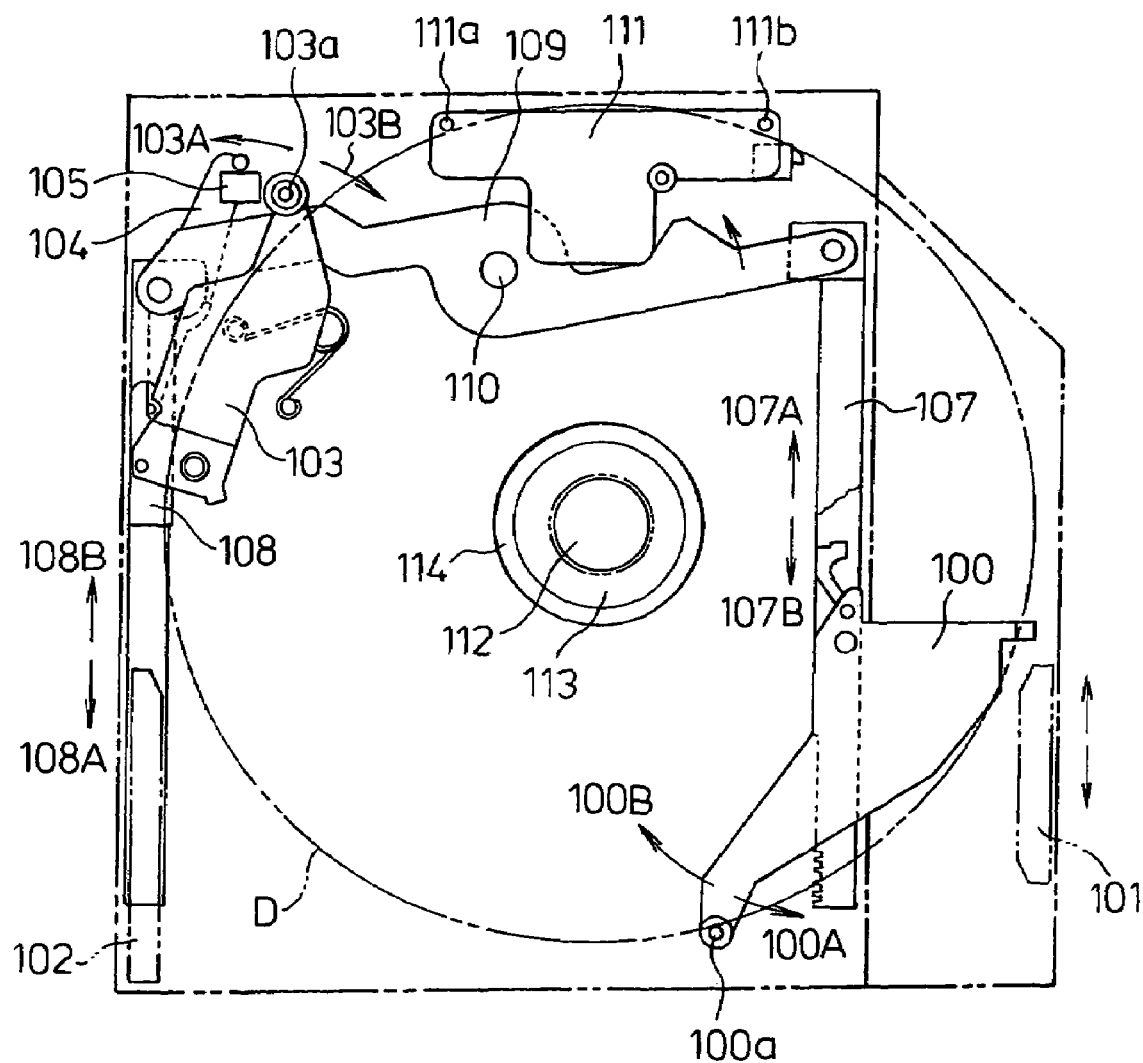
FIG. 38 is a second process diagram illustrating an operation aspect of a disk device according to a related art.
Figure 39A:
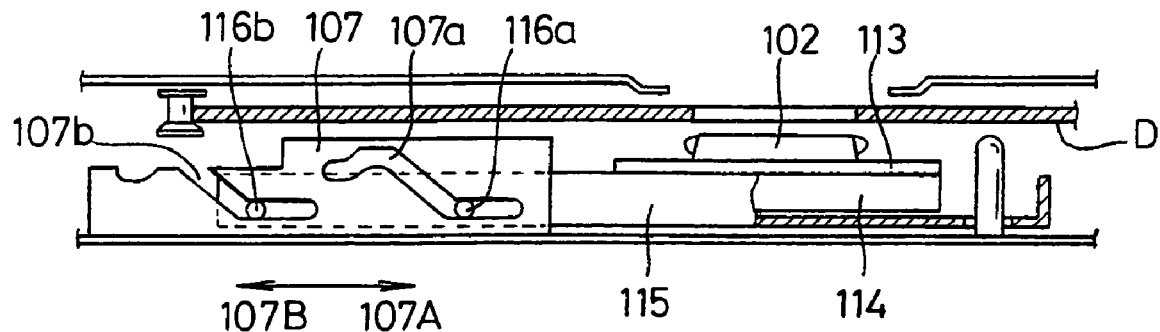
FIGS. 39A to 39C are diagrams of a third process illustrating an operation aspect of a disk device according to a related art.
Figure 39B:
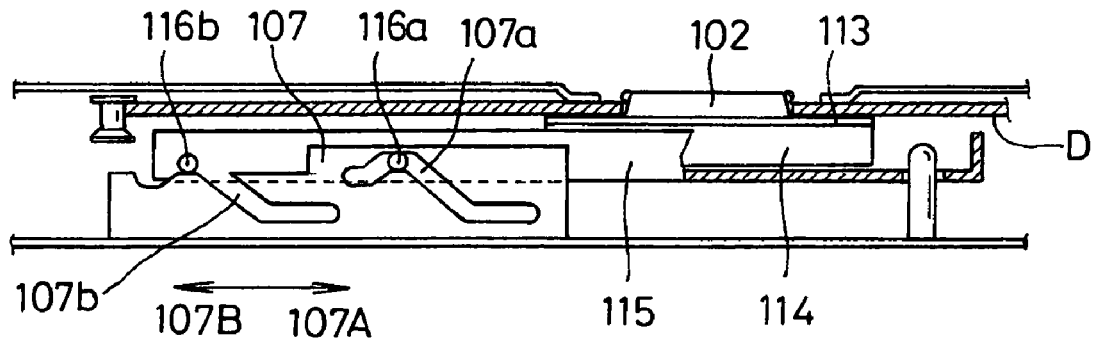
Figure 39C:
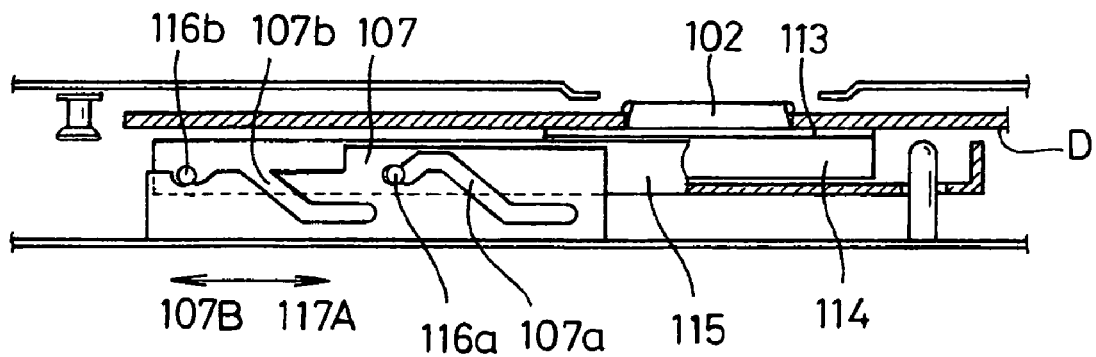

FIGS. 36A and 36B are diagrams comparing the wall thickness of the disk device in which the invention is embodied with the wall thickness of the disk device in which the invention is not embodied. As shown in FIG. 36A, in the disk device according to the invention, the bottom chassis 2B can move closely to the rear surface of the elevating frame 10 while the gap h2 between the top portion of the clamp head 8 and the optical disk D is held. On the other hand, in the disk device shown in FIG. 36B, if the elevating frame 10 descends, since the inclined state is held, the total wall thickness becomes H2. If it is compared with the wall thickness H1 of the disk device according to the invention, it can be apprehended that the relationship of H1<H2 is satisfied. In addition, the invention is embodied, so that it is possible to reduce the thickness of the disk device.

According to the invention, when the elevating frame descends, since the deviation of the gap between the bottom surface of the elevating frame and the bottom chassis can be decreased, the space in the disk device can be effectively used, so that it is possible to achieve the small thickness of the disk device.

What is claimed is:

1. A disk device comprising: a turn table;
   a clamp head;
   a spindle motor;
   an elevating frame including a front end, a rear end, and a rear end portion;
   wherein the turn table and the clamp head are fixed to a driving shaft of the spindle motor that is disposed adjacent to the front end of the elevating frame;
   means for rocking the front end of the elevating frame up and down to clamp an optical disk by the clamp head and to hold the optical disk on the turn table or to release the held optical disk;
   wherein when the front end of the elevating frame descends, a horizontal state of a plane of the front end of the elevating frame is held parallel to the optical disk; and
   wherein the elevating frame is movably supported by a chassis along at least one axis and is rocked on a different axis being positioned at the rear end portion, and where the different axis is non-parallel with the at least one axis.

2. The disk device according to claim 1, wherein the rear end of the elevating frame is supported in a buffering manner.

3. The disk device according to claim 1, wherein the elevating frame is further supported by at least one supporting tongue piece that comprises at least part of the at least one axis.

4. A disk device comprising:
   a front bezel;
   a slot in the front bezel for receiving an optical disk;
   an elevating frame that supports a turn table, a clamp head, and a spindle motor that selectively engages the optical disk, wherein the elevating frame has a first end adjacent the slot and a second, free end adjacent the clamp head;
   a first driving pin coupled to the elevating frame at a first distance from a supporting axis of the elevating frame and a second driving pin coupled to the elevating frame at a second, greater distance from the supporting axis of the elevating frame than the first distance; and
   a pair of cam grooves that engage the first and second driving pins to move the elevating frame up and down so that a plane of the second, free end of the elevating frame remains parallel to the optical disk when the elevating frame moves up and down;
   wherein the first end of the elevating frame is supported by first and second supporting tongue pieces respectively deposed at first and second places along the front bezel so that the first and second places are rocking support points and define the supporting axis of the elevating frame;
   wherein a ratio of a vertical movement distance of the first driving pin to the first distance is greater than a ratio of a vertical movement distance of the second driving pin to the second distance; and
   wherein when the second, free end of the elevating frame descends, the second supporting tongue piece located at the second driving pin side of the elevating frame is slightly floated and the first supporting tongue piece located at the first driving pin side of the elevating frame is slightly sunk.

5. The disk device according to claim 4, wherein the first end of the elevating frame is supported in a buffering manner.

6. A disk device comprising:
   a front bezel including a slot in the front bezel for insertion and removal of an optical disk;
   a turn table;
   a clamp head;
   a spindle motor;
   an elevating frame including a front end, a front end portion, a rear end, and a rear end portion;
   means for rocking the front end of the elevating frame up and down to clamp the optical disk by the clamp head and to hold the optical disk on the turn table or to release the clamped optical disk;
   wherein the turn table and the clamp head are fixed to a driving shaft of the spindle motor that is disposed at the front end portion of the elevating frame;
   wherein the elevating frame has a length that is oriented along a diagonal angled with respect to the front bezel and is supported substantially along the front bezel; and
   wherein when the front end of the elevating frame descends, the means for rocking rocks the elevating frame about a rocking axis substantially orthogonal to the length of the elevating frame at the rear end portion of the elevating frame and a horizontal state of a plane of the front end of the elevating frame is held parallel to the optical disk.

7. The disk device according to claims 6, wherein the rear end of the elevating frame is supported in a buffering manner.

* * * * *

UNITED STATES PATENT AND TRADEMARK OFFICE
CERTIFICATE OF CORRECTION

| | | |
|---|---|---|
| PATENT NO. | : 7,536,702 B2 | Page 1 of 1 |
| APPLICATION NO. | : 11/252460 | |
| DATED | : May 19, 2009 | |
| INVENTOR(S) | : N. Fujimura | |

It is certified that error appears in the above-identified patent and that said Letters Patent is hereby corrected as shown below:

| COLUMN | LINE | |
|---|---|---|
| 18 (Claim 4, | 11 line 21) | "deposed" should read --disposed-- |
| 18 (Claim 7, | 53 line 1) | "claims" should read --claim-- |

Signed and Sealed this

Sixteenth Day of March, 2010

David J. Kappos
*Director of the United States Patent and Trademark Office*